(12) United States Patent
Roth et al.

(10) Patent No.: US 8,083,547 B2
(45) Date of Patent: Dec. 27, 2011

(54) HIGH DENSITY PLUGGABLE ELECTRICAL AND OPTICAL CONNECTOR

(75) Inventors: Richard F. Roth, Brookline, NH (US); Sepehr Kiani, Watertown, MA (US)

(73) Assignee: Amphenol Corporation, Wallingford, CT (US)

( * ) Notice: Subject to any disclaimer, the term of this patent is extended or adjusted under 35 U.S.C. 154(b) by 128 days.

(21) Appl. No.: 12/243,841

(22) Filed: Oct. 1, 2008

(65) Prior Publication Data

US 2010/0081303 A1  Apr. 1, 2010

(51) Int. Cl.
H01R 13/648 (2006.01)
(52) U.S. Cl. .................. 439/607.23; 439/607.1
(58) Field of Classification Search ............ 439/607.23, 439/607.1, 353
See application file for complete search history.

(56) References Cited

U.S. PATENT DOCUMENTS

| | | | |
|---|---|---|---|
| 4,686,607 A | 8/1987 | Johnson | |
| 5,838,856 A | 11/1998 | Lee et al. | |
| 6,361,218 B1 | 3/2002 | Matasek et al. | |
| 6,409,543 B1 | 6/2002 | Astbury, Jr. et al. | |
| 6,506,076 B2 | 1/2003 | Cohen et al. | |
| 6,592,381 B2 | 7/2003 | Cohen et al. | |
| 6,602,095 B2 | 8/2003 | Astbury, Jr. et al. | |
| 6,762,941 B2 | 7/2004 | Roth | |
| 6,776,645 B2 | 8/2004 | Roth et al. | |
| 6,832,858 B2 | 12/2004 | Roth et al. | |
| 6,986,607 B2 | 1/2006 | Roth et al. | |
| 7,008,117 B2 | 3/2006 | Kiani et al. | |
| 7,073,953 B2 | 7/2006 | Roth et al. | |
| 7,204,016 B2 | 4/2007 | Roth et al. | |
| 2005/0135755 A1 | 6/2005 | Kiani et al. | |
| 2006/0002659 A1 | 1/2006 | Kiani et al. | |
| 2006/0073709 A1 | 4/2006 | Reid | |
| 2007/0013017 A1 | 1/2007 | Badehi et al. | |
| 2008/0089650 A1 | 4/2008 | Legler et al. | |
| 2008/0102659 A1 | 5/2008 | Liu | |
| 2008/0207019 A1 | 8/2008 | Taylor | |

OTHER PUBLICATIONS

Kipp, Scott "Quad Small Form-factor Pluggable (QSFP) Transceiver Specification"; Rev. 1.0, QSFP Public Specification, pp. 1-71, note pp. 22 & 33.
Status on the Project Interconnect by Optics, year 1, Sep. 28, 2002, 25 pages.

Primary Examiner — Briggitte R Hammond

(57) ABSTRACT

A connector assembly is provided that includes a front end mating connector which is received in a socket. The front end mating connector includes a pluggable transceiver, latching mechanism, and passive optical connector. Standard optical ribbon fibers are provided that plug into the passive connector, which in turn plugs into the transceiver. The passive connector and the transceiver are coupled together by the latching mechanism. The coupled connector then plugs into the socket in a first direction. The socket includes electrical connector wafers. As the transceiver is plugged into the socket, circuit boards within the transceiver move in a second direction to engage the wafers. The transceiver has a circuit that converts the optical signals received by the receiver ribbons into electrical signals that are recognized by the wafers and passed to the circuit board. The circuit also converts the electrical signals received from the circuit board through the wafers in the socket into optical signals for transmission by the optical ribbon fibers.

10 Claims, 25 Drawing Sheets

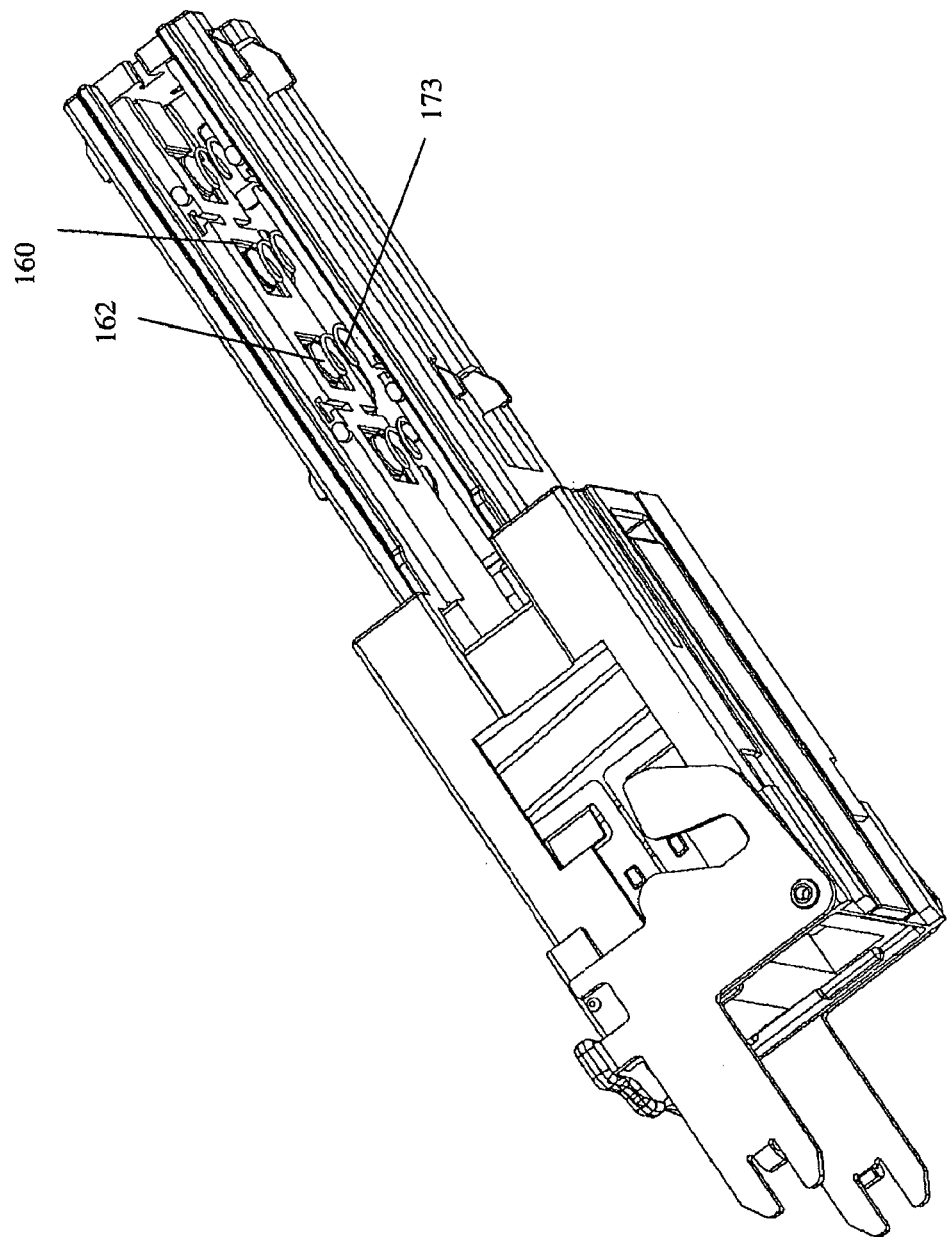
Figure 20 - Alternate view showing internal springs

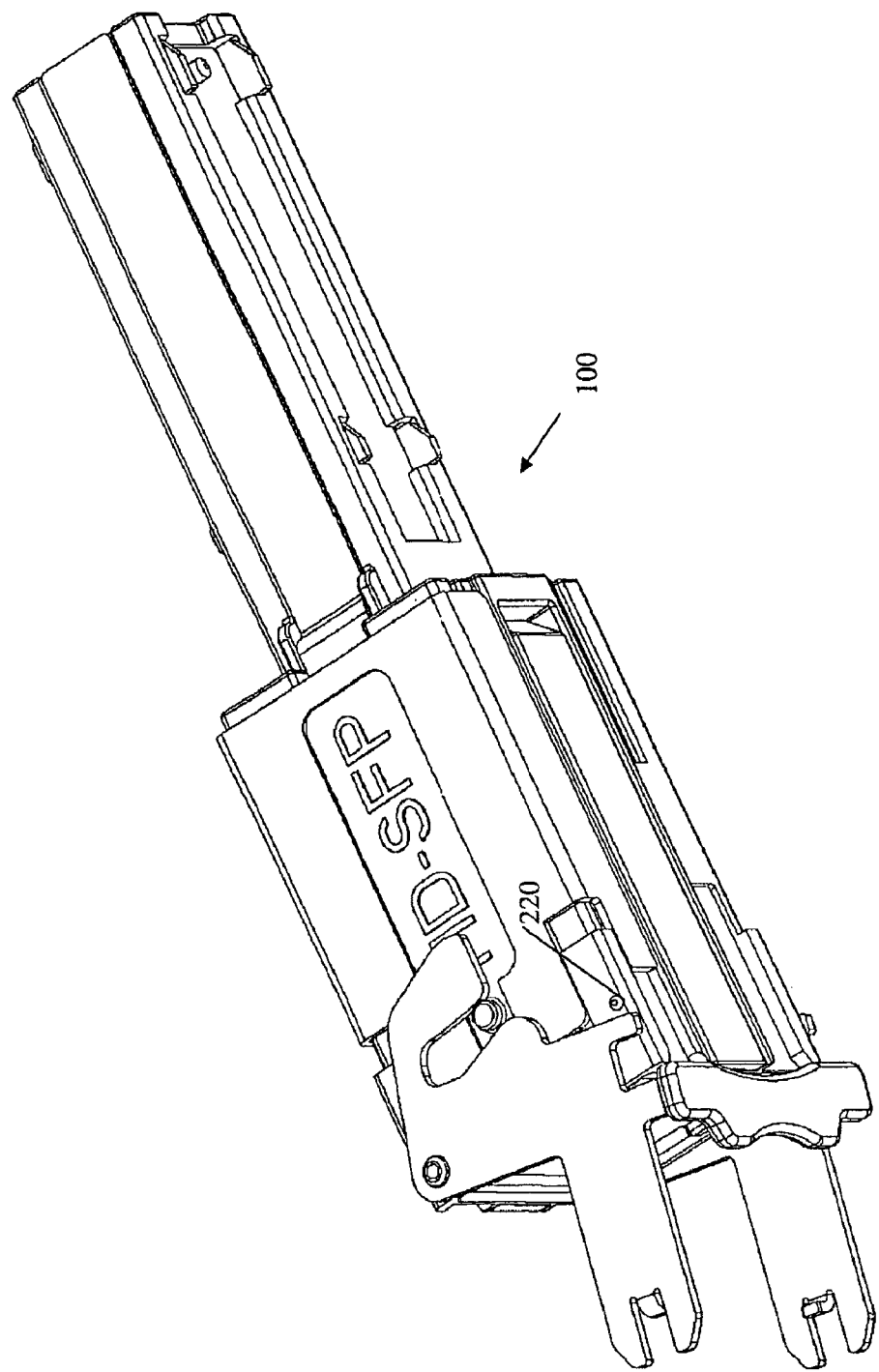
Figure 21 - Initial Unplugged State

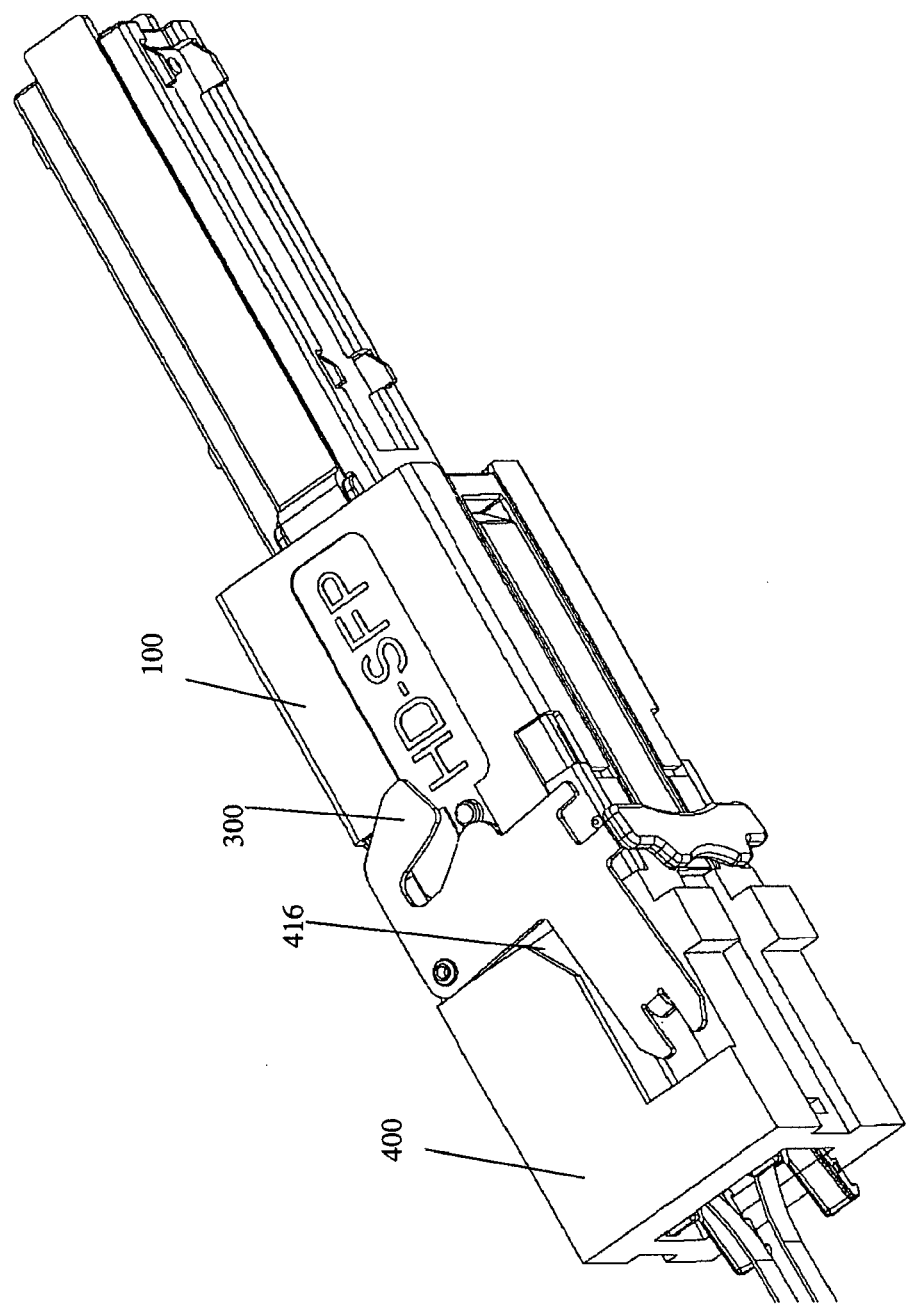
Figure 22 - Coupling W/Passive Connector

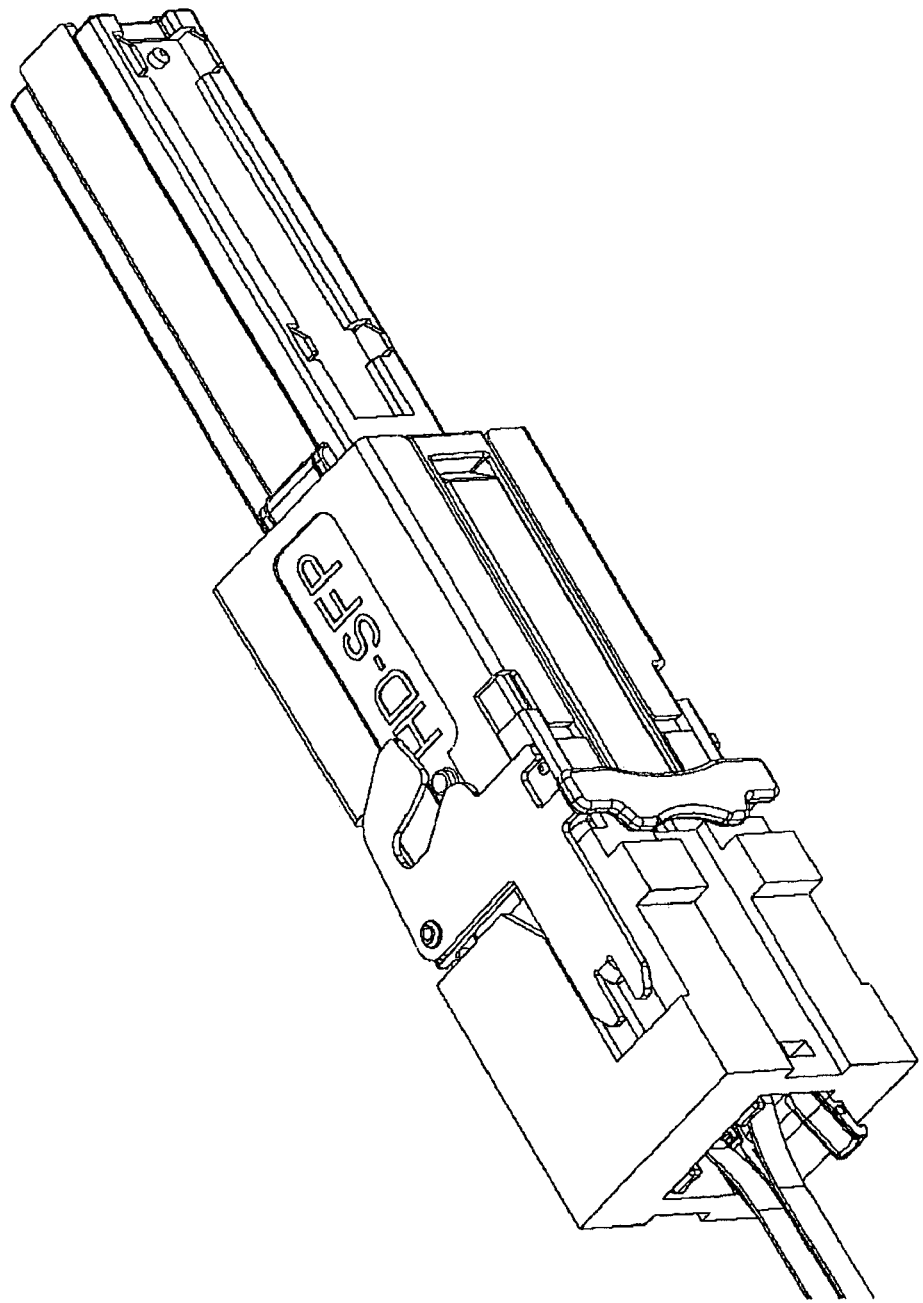
Figure 23 - Coupled To Passive Connector

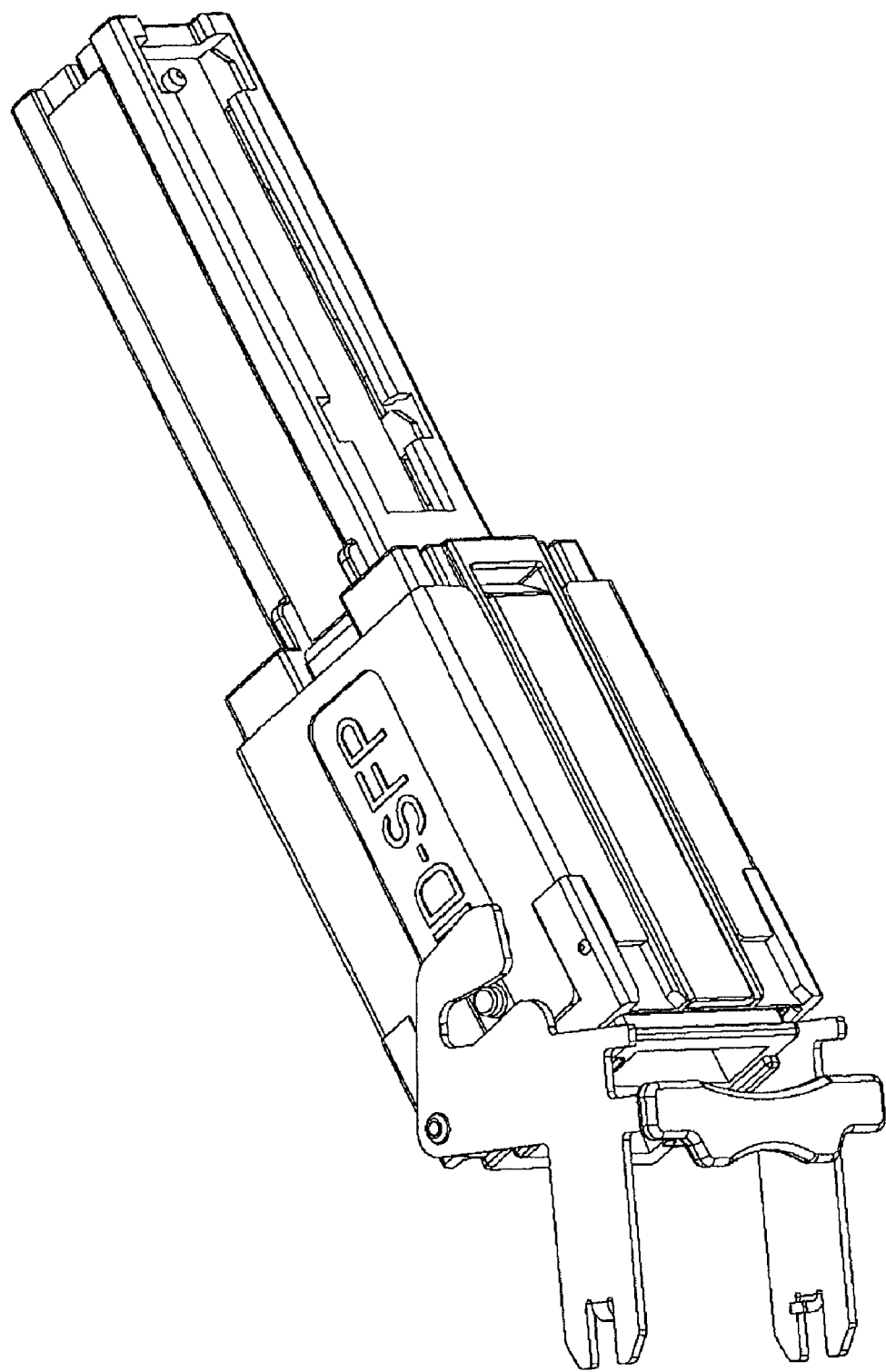
Figure 24 - Releasing From Socket

HIGH DENSITY PLUGGABLE ELECTRICAL AND OPTICAL CONNECTOR

BACKGROUND OF THE INVENTION

1. Field of the Invention

The present invention relates to a High Density Pluggable connector. More particularly, to a High Density electrical and optical connector that has a bi-directional connection to the socket.

2. Background of the Related Art

Electronic systems are often assembled from one or more printed circuit boards (PCBs) which contain a wide variety of electronic components. These boards are often referred to as "daughter cards" which connect to a common backplane or "mother board" which also contains various connectors and circuitry. The daughter cards usually include one or more connectors that allow for communication with the backplane or an opposing daughter card when configured in a midplane scenario. A midplane is generally nothing more than a card sandwiched between two opposing daughter cards. The cards can be parallel or perpendicular depending upon the application. An example of such a system is shown in U.S. Pat. No. 4,686,607 to Johnson.

In order for the cards to communicate, the electrical signals referred to as "traces" are routed from one daughter card to another and travel through the backplane as well. These traces are produced using readily known photolithographic manufacturing techniques which produce embedded copper lines that carry the signals along a cards matrix. The electrical connectors that enable these cards to talk with each other are mounted to pads or vias that contact the traces in the matrix and route the appropriate signals. Some examples of connectors can be seen in U.S. Pat. Nos. 6,409,543; 6,506,076; 6,592,381, and 6,602,095, which are hereby incorporated as reference.

When there is a need for signals to be carried at higher speeds or greater distances, fiber optic connectors are typically employed. Fiber optic connectors are shown, for instance, in U.S. Pat. No. 6,776,645 and U.S. Patent Application Publication No. 2006/0002659. These connectors can be mounted on either end of the PCB. The side opposing the backplane or midplane is generally referred to as the front panel. The front panel is typically the outside of the system that the user sees and has access to. Commercially standard connectors have been employed in conjunction with pluggable transceiver technologies. The pluggable transceivers literally plug through an opening in the front panel which is typically aluminum and attach directly to a pre-affixed connector within a shielded cage on the daughter card. When the devices are fully coupled, they typically latch in place and await connection to a second fiber optic transmission line, which is plugged directly into the device such as an industry standard optical connector as the ST (Straight Tip) or LC (Lucent Connector). These optical connectors typically house a ferrule that holds a single-fiber or a multi-fiber optical ribbon. A parallel (multi-fiber) ferrule simply allows for a signal greater carrying capacity in the space available. The same sort of devices can be used on the backplane side, but generally involve much more complicated mechanical designs to implement latching that is automatic and blind to the user, as shown in U.S. Pat. No. 6,762,941 and Published No. 2006/0002659.

It is often desirable for all these systems to be as compact and dense as possible. Thus, when connectors shrink in size, their latching mechanisms and other components must be reduced in size as well. This miniaturization of components creates a challenge when designing a connector that is robust, reliable and easy to use.

The present design addresses many of these challenges while simultaneously implementing many new and innovative features. In addition it attempts to address the present needs of the equipment manufacturers who are desirous of employing front panel parallel optical transceiver technologies in their systems in an effort to drive toward miniaturization, reduced power and lower heat formation, while improving the shielding for higher speed applications.

Though these devices may differ slightly from manufacturer to manufacturer, they are generally the same. One such module is shown in U.S. Publication No. 2007/0013017. Each module includes opto-electronics, such as surface emitting 850-nm VCSELs (Vertical Cavity Surface Emitting Laser) and detectors. The modules also include interface electronics, such as driver and receiver circuits, along with an interface to a fiber ribbon consisting of multiple glass fibers, housed in a connector. These connectors can transfer data over different channels in parallel, offering point-to-point communication with bandwidth and distance achievements far exceeding copper capabilities.

One drawback of any of the existing front panel solution, whether electrical or optical, is the fact that the connections require a right angle interconnect to transition from the plugging direction to the parallel surface of the daughtercard, which is not accessible to the user. In this manner, the connector is directly pressed onto the (optical or electrical) contacts of the PCB or faceplate in a single motion and in a direction perpendicular to faceplate, such as shown by at least the Johnson and Roth '858 patents above. By locating the contacts on the front surface, a greater surface area of the faceplate or PCB is required as the number of contacts is increased for a particular application. Consequently, the number of connections that can be made is limited by the amount of front surface that is available on the PCB or faceplate. In other words, as signal count increases so does the width of the connector which is not desirable from a system architecture point of view. Maximizing front panel density is often crucial since lower density cards typically mean that more system level cards are required to do the same job.

This also means that the right angle connector at higher electrical speeds is far more difficult to implement and design due to the many nested signal integrity problems that are likely to occur. As the signal counts and speeds increase, the trace routings that come out of the right angle connector also become more challenging to implement. In the proposed approach both of these problems are overcome by purely changing the position of the electrical interface by a 90 degree rotation in relation to the conventional approaches, thereby allowing the connector to grow in length vs. width while providing for maximum flexibility in routing the traces on the circuit card and simplifying the overall right angle connector design.

SUMMARY OF THE INVENTION

Accordingly, it is an object of the invention to provide a high-density electrical and/or optical connector. It is another object to provide a connector that minimizes the amount of front surface on the PCB or faceplate, while maximizing the number of contacts. It is another object of the invention to provide a connector that does not have any contacts along a front surface of the connector or the front surface of a PCB or faceplate to which the connector is connected. It is a further object to provide a connector that has contacts located along a longitudinal axis of the connector as it is inserted into the corresponding socket behind the faceplate. It is another object of the invention to provide a connector that converts optical signals to electrical signals and converts electrical signals to optical signals. It is another object of the invention to provide a connector that can be inserted into a socket, and can self-eject from the socket when a latching mechanism is decoupled. It is another object of the invention to provide a circuit card that has electrical connections along the length of the card that interface with contacts "conductors" positioned in a socket. It is yet another object of the invention to provide a connector having both transmitting optical fibers that communicate with a first electrical circuit and receiving optical fibers that communicate with a second electrical circuit. It is yet another object of the invention to provide a connector that interfaces with optical fibers at one end and electrical components at an opposite end. It is another object of the invention to provide a latching mechanism for securing a first connector to a second connector and for securing to a third connector. And it is the final object of invention to create a heat dissipation means for removing heat from the device when it is in operation.

In accordance with these and other objects, a connector assembly is provided. The connector assembly includes a front end mating connector that mates with a socket. The connector assembly is designed to be used, for instance, to extend into a front panel, which can be a metallic plate or a printed circuit card. The front end mating connector includes a pluggable transceiver, latching mechanism, and passive optical connector. Standard optical ribbon fibers are provided, including a transmitting ribbon which transmits an optical signal out of the assembly and a receiving ribbon which receives an optical signal. The ribbons plug into the passive connector, which in turn plugs into the transceiver. In the present invention, there are two desired states; one in which the passive connector and the transceiver are coupled together prior to coupling to the daughter card socket and the second state where the transceiver is plugged into the socket and the passive connector is then plugged into the transceiver.

The daughter card socket includes electrical connector wafers that interface with the circuit board. The transceiver has a circuit that converts the optical signals received by the receiver ribbons into electrical signals that are recognized by the wafers and passed to the circuit board. The circuit also converts the electrical signals received from the circuit board through the wafers in the socket into optical signals for transmission by the optical ribbon fibers.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 20 is another view of the assembled transceiver with cover removed showing the connection of the springs to the boards in the male portion of the connector.

FIG. 21 is a view of the transceiver in the unplugged state.

FIG. 22 is a view of the transceiver being coupled with the passive connector, with the socket removed for illustration.

FIG. 23 is a view of the transceiver coupled to the passive connector, with the socket removed for illustration.

FIG. 24 is a view of the transceiver releasing from the socket, with the socket removed for illustration.

DETAILED DESCRIPTION OF THE PREFERRED EMBODIMENTS

Figure 1:
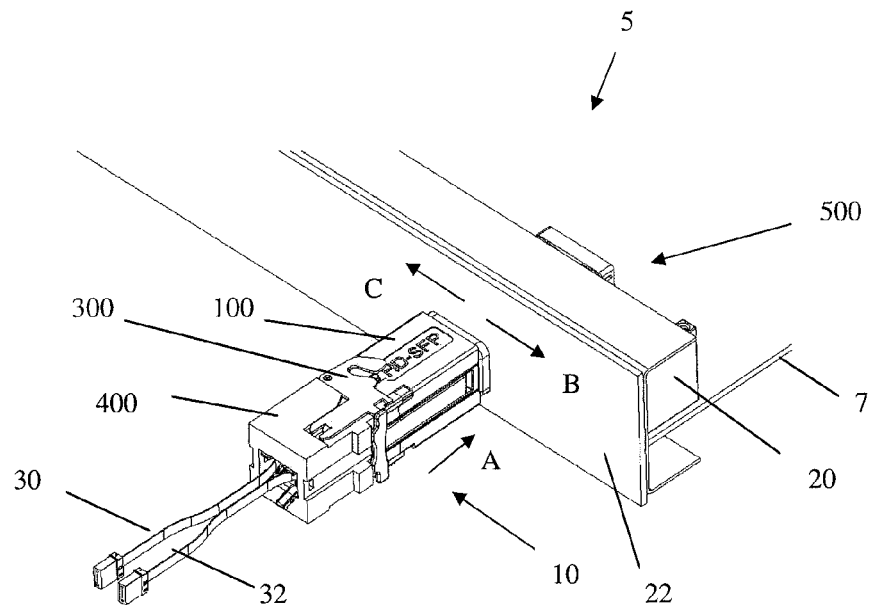
FIG. 1 is a perspective view of the overall connector assembly system having a transceiver with a latching mechanism, a passive optical connector that plugs into the transceiver and an electrical socket in accordance with a preferred embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. In the describing the present invention, terms such as "top," "front," "leading," "rear," "rearward," and "forward" are used only to facilitate the description of the invention. The terms are used to specify the direction or location of one component with respect to another with the forward and rear directions arbitrarily selected for illustrative purposes only. Such terms are not meant to be limiting as to the invention.

Turning to the drawings, FIG. 1 shows the SFP connector assembly 5 in accordance with a preferred embodiment of the invention. The connector assembly 5 includes a front end mating connector 10 that mates with a socket 500. The connector assembly 5 is designed to be used, for instance to extend through a front panel 20, which can be a metallic plate or a circuit card. The socket 500 extends from the rear of the panel 20, through the panel 20 to the front, and protrudes slightly from the front face of the panel 20. The socket, however, need not extend through the entire panel 20, but need only extend part way into the panel 20. With the socket 500 in place within the panel 20, the front end mating connector 10 can be easily received in the socket 500.

Figure 2:
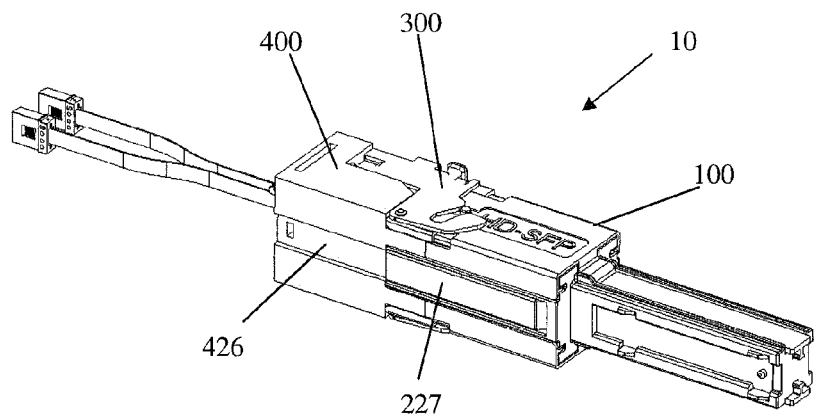
FIG. 2 is a perspective view of the pluggable transceiver coupled to the passive optical connector with the latching mechanism engaged.

As shown in FIGS. 1 and 2, the front end mating connector 10 includes a pluggable transceiver 100, latching mechanism 300, and passive optical connector 400. Standard optical ribbon fibers 30, 32 are provided, including a transmitting ribbon 30 which transmits an optical signal out of the assembly 5 and a receiving ribbon 32 which receives an optical signal. The ribbons 30, 32 plug into the passive connector 400, which in turn plugs into the transceiver 100. The passive connector 400 and the transceiver 100 are coupled together by the latching mechanism 300.

The transceiver 100 first couples to the socket 500 then the passive connector 400 couples to the transceiver 100. In an alternate embodiment, both of the coupled connectors 10 plug directly into the socket 500. The socket 500 (which is shown in greater detail in FIG. 16) includes electrical connector wafers 505 that interface with the circuit board 7. The transceiver 100 has a circuit board 172 (which is shown in greater detail in FIG. 11) with circuitry that converts the optical signals received by the receiver ribbons 32 into electrical signals that are recognized by the wafers 505 and passed to the circuit board 7. The circuit 172 also converts the electrical signals received from the circuit board 7 through the wafers 505 in the socket 500 into optical signals for transmission by the optical ribbon fibers 30.

Figure 3:
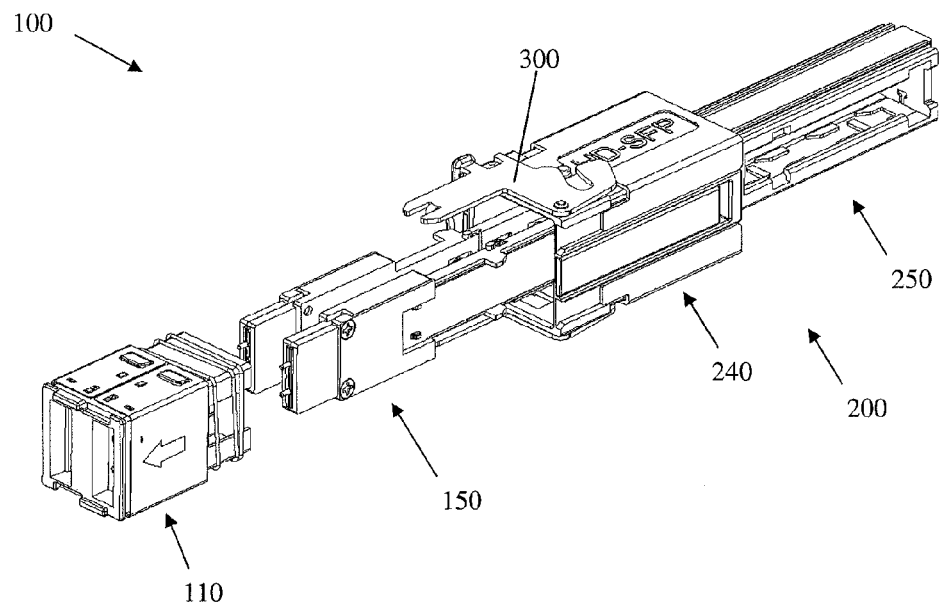
FIG. 3 is a perspective view of the transceiver having a front end shuttered adapter, electrical and optical subassemblies and a housing forming the male member.
Figure 4:
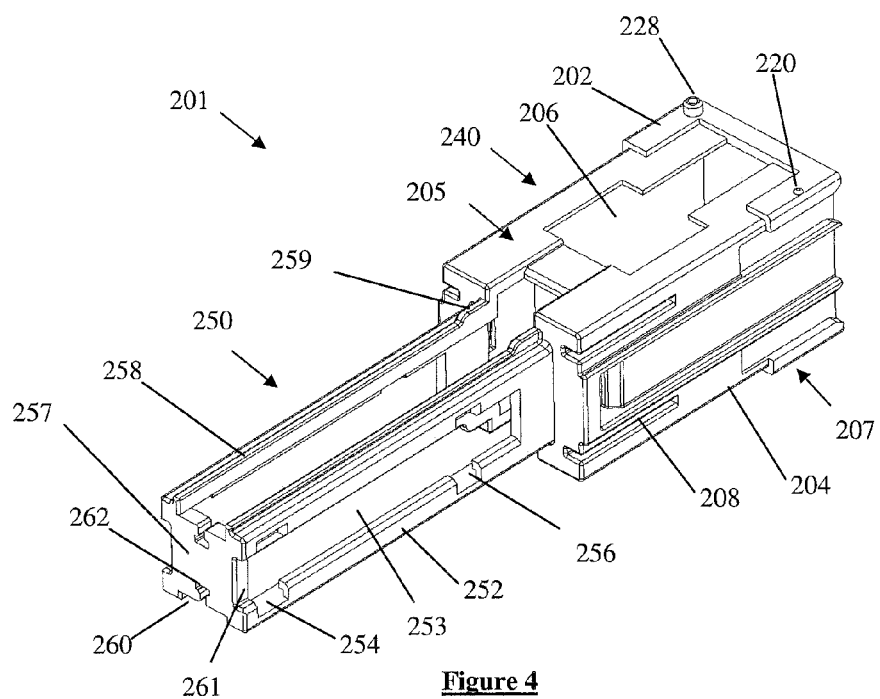
FIG. 4 is a perspective view of the transceiver housing having the cover removed to illustrate the bare body.

Referring to FIG. 3, the pluggable transceiver 100 is shown in greater detail. The transceiver 100 has a front end adapter 110 with shuttered doors, optical and electrical receptacle 150, and a housing 200 with a main body portion 240 and a male member portion 250. The male portion 250 extends outward from the front leading surface of the main body portion 250. The main body portion 240 and the male body portion 250 are shown in FIG. 4. The housing 200 also includes a cover 203 (FIG. 5) that extends over the top and bottom of the main body 240 and the male body 250.

Referring to FIG. 4, the main body 240 and the male body 250 are formed together by being cast from a single piece, but may also be separate pieces which are connected together. The main body 240 has side walls 204, a top 205 and a bottom 207. A window 206 is formed at the top 205 and the bottom 207 of the main body portion 240. A brace 202 connects the rear end of the side walls 204, and serves as the support for the latching mechanism 300. A pivot 228 is positioned at one corner of the brace 202, and a locking guide boss 220 is provided along the opposite side of the brace 202. Elongated slots 208 are formed in the side walls 204 at the front end of the main body portion 240. The slots 208 extend substantially parallel to the top 205 and bottom 207 of the main body 240.

Figure 5:
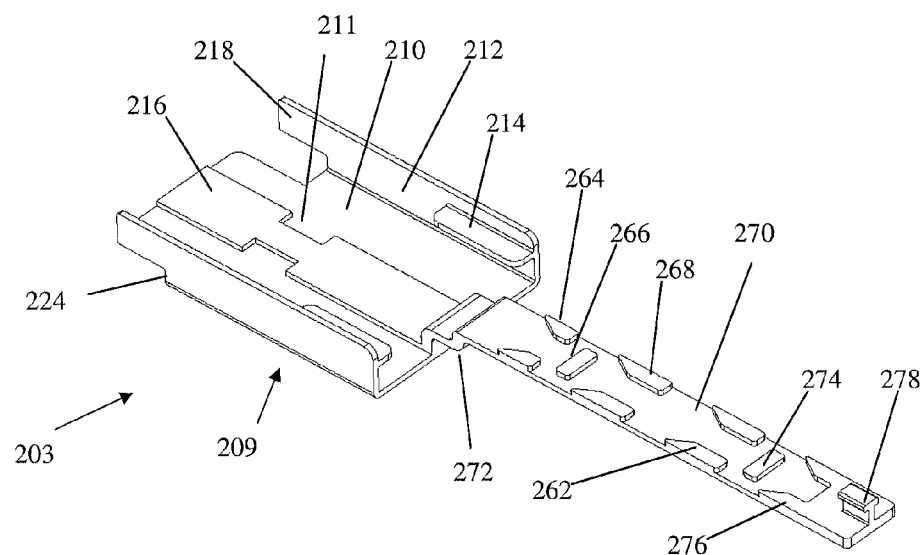
FIG. 5 is a perspective view of the cover used with the body of FIG. 4

The male member portion 250 forms a leading section of the front end mating connector 10 and extends into the socket 20. The male portion 250 is formed by four elongated beams 252. Upright rails 258 extend along the top surface of the two upper beams 252. A step 259 extends upward from a portion of the rail 258 that is directly adjacent the main body portion 240. The beams 252 form windows 253 in the sides, top and bottom faces of the male member 250. Front and rear notches 254, 256 are formed in the beams 252. The beams 252 are joined together by an end piece 257. A support ledge 260 is formed on the top and bottom of the end 257 to support the cover 203 when it is positioned on the male body 250. A receiving groove 262 is formed in the top and bottom of the end piece 257 to receive an engagement projection 278 of the cover 203 (FIG. 5). And, a recessed support 261 is formed on the sides of the end piece 257 to receive and support the leading ends of the electrical and optical receptacles 150 (FIG. 3).

Turning to FIG. 5, the cover 203 has a main body portion 209 and an elongated flat male member portion 270. The main body portion 209 has a bottom surface 210 and sides 212 extending upwardly (in the embodiment shown) from the bottom 210. A narrow guide member 214 is provided along the sides 212 toward the rear of the main body portion. The guide 214 is aligned to be slidably received in the slots 208 formed in the sides of the main body 240. The guide 214 and slots 208 cooperate to ensure that the cover 203 is properly aligned and received on the main body 240 and the male portion 250.

Figure 8:
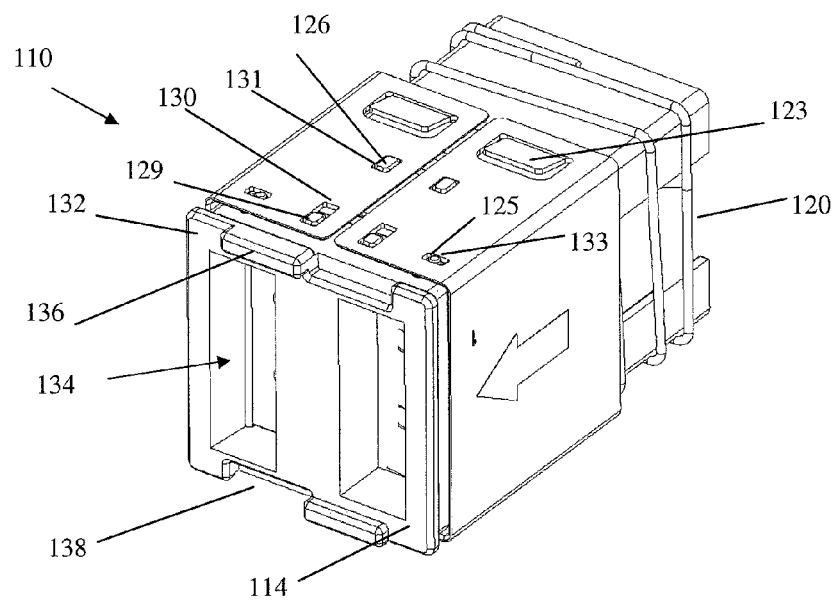
FIG. 8 is a perspective view of the assembled shuttered front end adapter.

Along the rear of the cover 203, a portion of the sides 212 and the front cover 203 are removed so that the sides 212 form backward extending tabs 218. In addition, the rear of the cover 203 forms a tab portion that is slidably received between the arms of the U-shaped brace 202. The side tabs 218 are received under the brace 202 along the side walls 204. A raised mid-section 216 extends up from the surface of the bottom 210, forming catches 211. The catches 211 receive the two raised retention flanges 123 located on the front end adapter 110 (FIG. 8). The catches 211 provide a latching surface for the flanges 123, thereby retaining the front end adapter 110 once it has been pushed into the body.

As shown in FIG. 5, the male member portion 270 of the cover 203 has various ramp members 264, 268, 262, 276 and stop members 266, 274. Those ramp and stop members are positioned along the length of the male portion 270 and face inwardly when the cover 203 is positioned on the main body 240, and are accessible through the windows 253 of the male portion 250. The rear of the male member portion 270 has a step 272 that offsets the male member portion 270 from the bottom surface 210. A T-shaped engagement projection 278 is provided at the leading edge of the male member 270.

Figure 19:
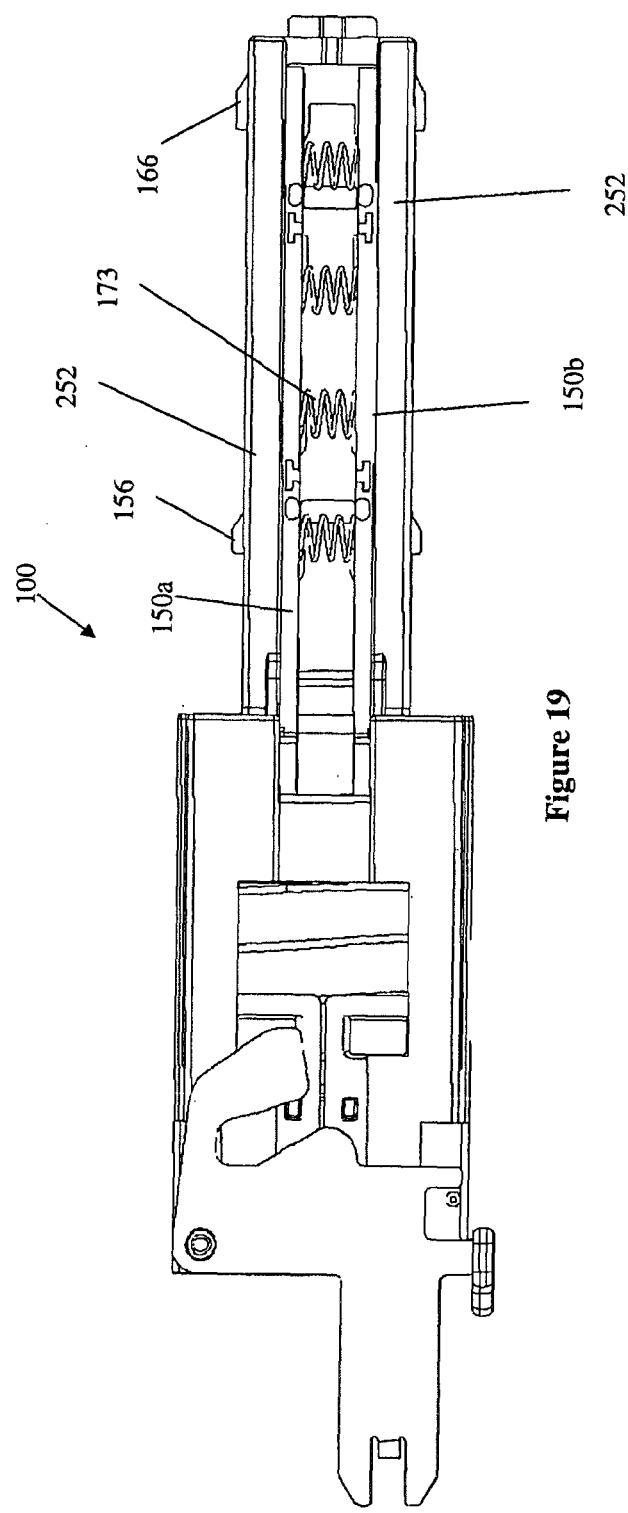
FIG. 19 is a side view of the assembled transceiver with a cover removed showing the springs which bias the boards outward in the male portion of the connector.
Figure 25A:
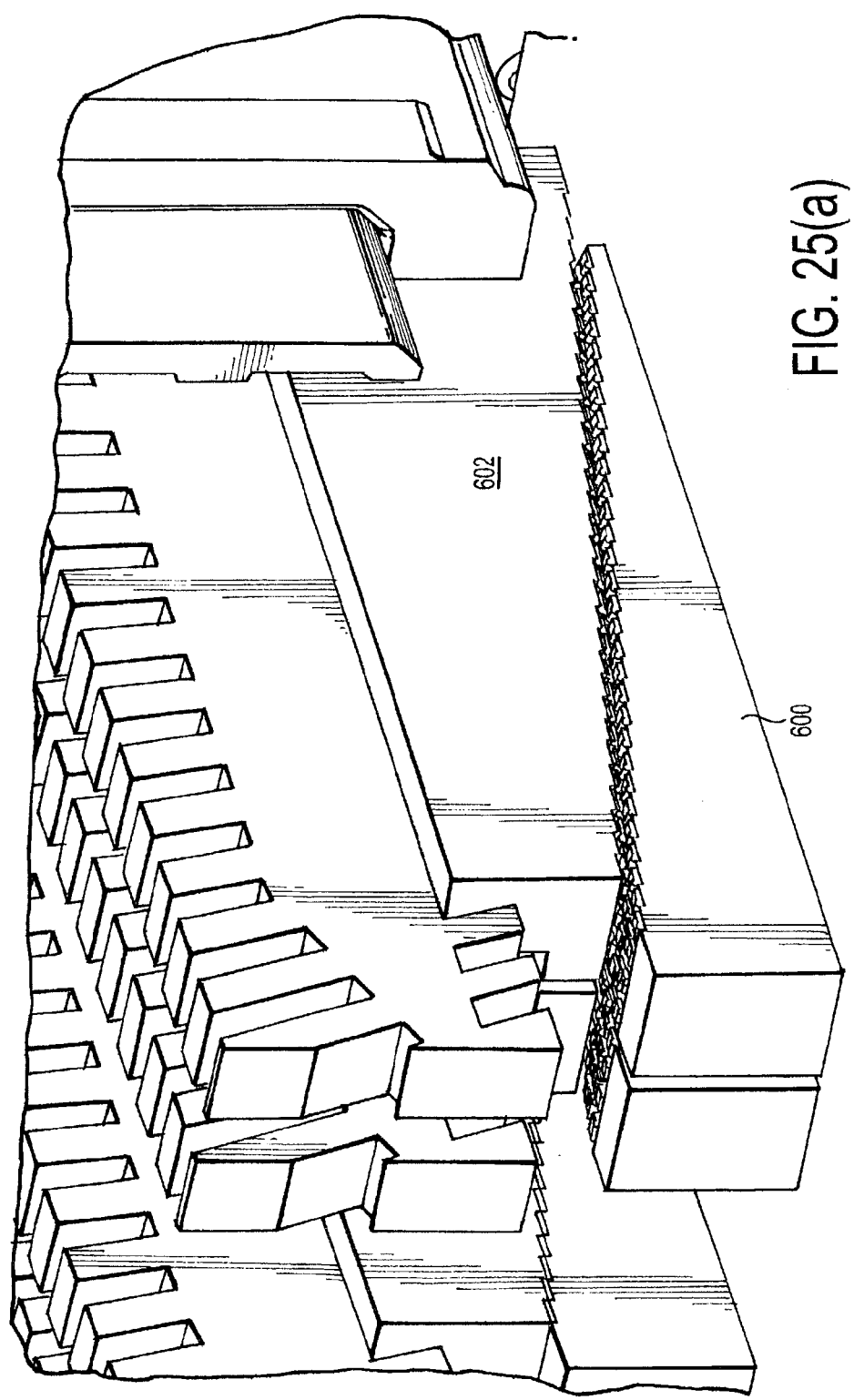
FIGS. 25(a)-(d) and -26 are perspective views of an alternative embodiment of the invention.
Figure 25B:
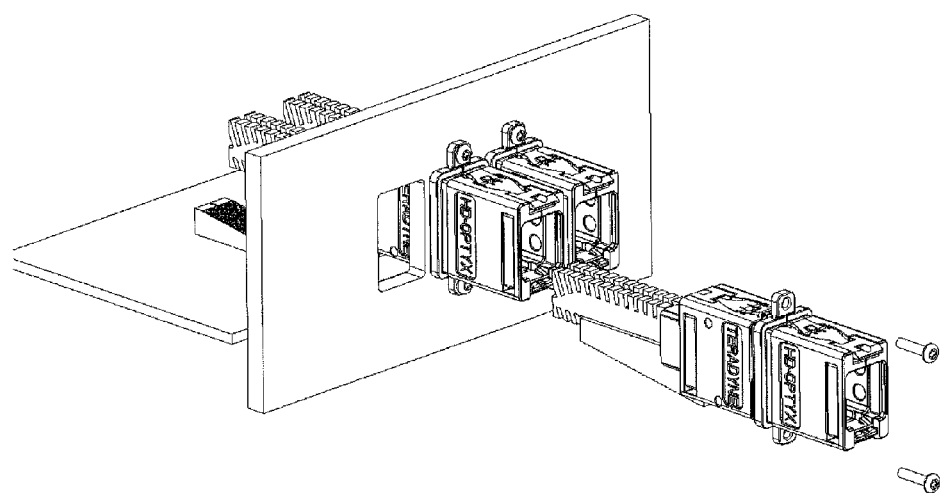
Figure 25C:
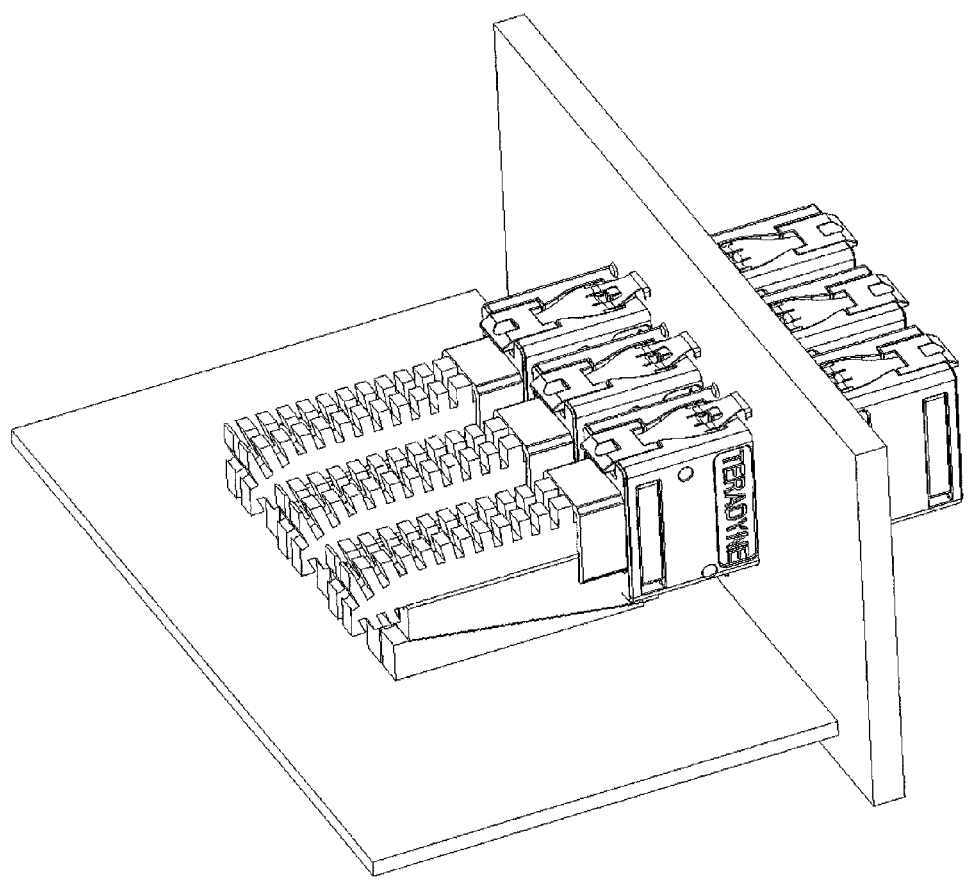
Figure 25D:
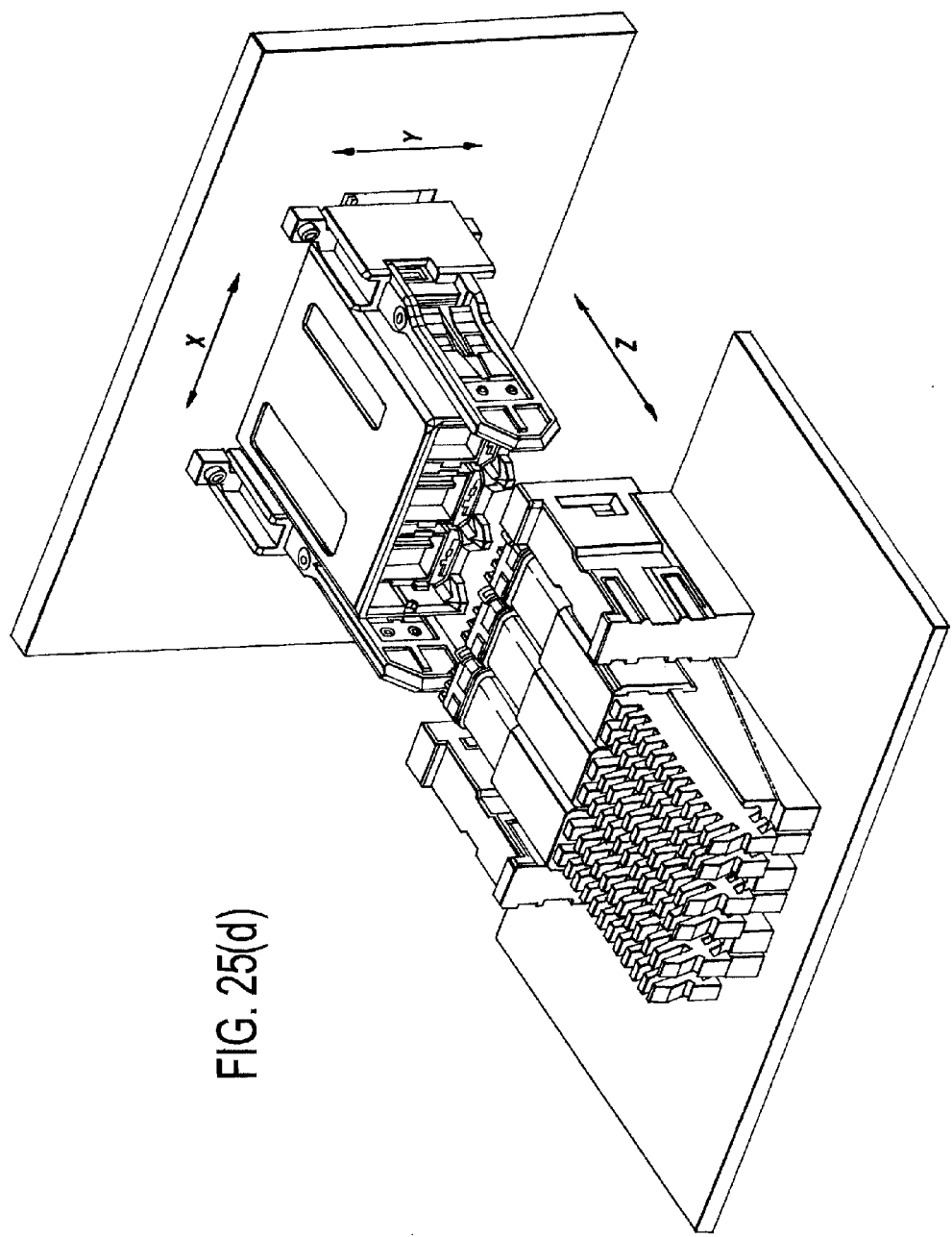

The body 250, 240 and cover 203 are configured so that the cover 203 is slidably received by the body 250, 240. To slidably engage the body 250, 240 with the cover 203, the bottom surface 210 of the cover 203 is placed on the main body 240. The cover 203 slides along the top of the main body 240 until the guides 214 of the cover 203 enter the corresponding mating slots 208 of the main body 240. The guides 214 continue to slide into the slots 208 as the cover 203 continues to slide onto the main body 240. The guides 214 ensure that the cover 203 is properly received on the main body 240, and that the engagement projection 278 enters the groove 262 at the end piece 257 of the male portion 250. The cover 203 will stop when the ledge 224 of the cover 203 contacts the brace 202 and the guides 214 are near the end of the slots 208. When the latch 300 is not being operated, the position of the cover 203 is controlled by the front end adapter 110. The spring 120 of the adapter 110 biases the cover 203 towards the latch 300. But, the spring 120 is not strong enough to overcome the force required to compress the inner springs 173 connected to the receptacles 150a, 150b (FIG. 19). Therefore, the cover 203 remains in a fixed position when the assemblies 150 remain pressed outward.

Figure 6:
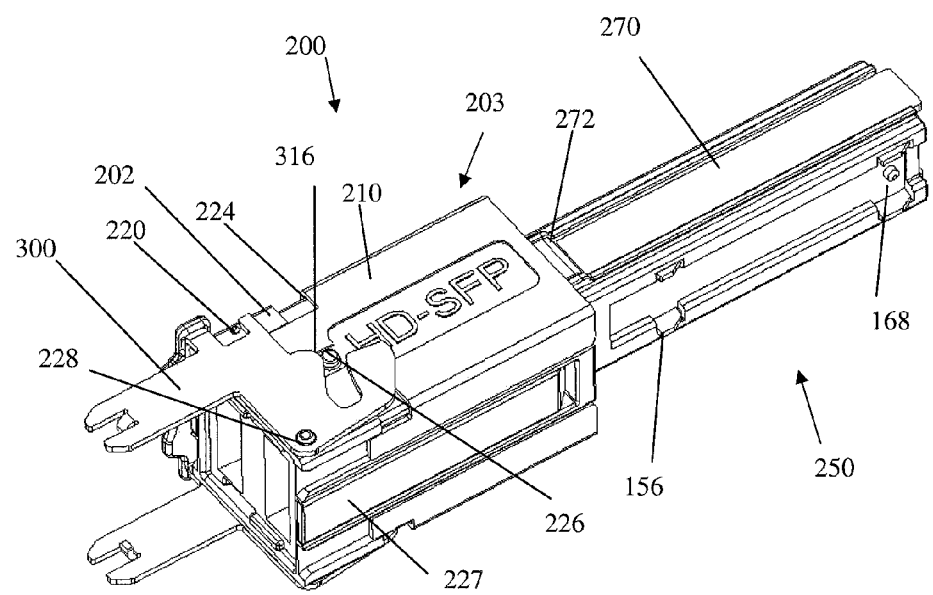
FIG. 6 is a perspective view of the assembled transceiver housing.

Turning to FIG. 6, the cover 203 is shown on the body 240, 250. There is a slight gap between the recessed ledge 224 of the cover 203 and the end of the side arm of the brace 202. The gap indicates that the latch 300 is in the forwardmost locked position, which ensures that there is constant force on the electrical connector contacts. In addition, the end of the male portion 270 of the cover 203 is not fully received on the male portion 250. When the cover 203 is received by the body 240, 250, the male member portion 270 lies within the rails 258 of the beams 252. The end of the male member portion 270 rests on the support ledge 260, and the stair 272 aligns with the step 259. The rails 258 provide keying when body 100 plugs into socket 500. The T-member 278 is retained in the groove 262, which prevents the cover 270 from slipping off the male body 250 in the transverse and/or forward directions. The socket 500 has an opening 518 that is configured so that the rails 258 of the male member 250 can only be inserted into the opening 518 of the socket 500 in one orientation.

The step 259 is stepped upward so as to create clearance for any internal components. Specifically, the adapter 110 is in the forwardmost position when the connector 100 is engaged in the socket 500 and the user is releasing it from the socket, which means that the cover 203 must move toward the latch to remove the plug 100 from socket 500. The slots 208 and the guides 214 further cooperate to prevent the cover 203 from becoming separated from the body 240, 250 by any force applied perpendicular to the face of those elements. Likewise, the engagement projection 278 is engaged within the T-shaped groove 262, so that the male member portion 270 of the cover 203 does not separate from the body 240, 250 by a force applied perpendicular to the face of those elements.

As further shown in FIG. 6, the exterior surface of the cover 203 is provided with guide bosses 220, 226 positioned along the top surface of the cover 203. The latch mechanism 300 is engaged to the housing 200 at one corner of the top surface by the pivot 228. The latch 300 pivots with respect to the transceiver housing 200 about the pivot 228.

Figure 7:
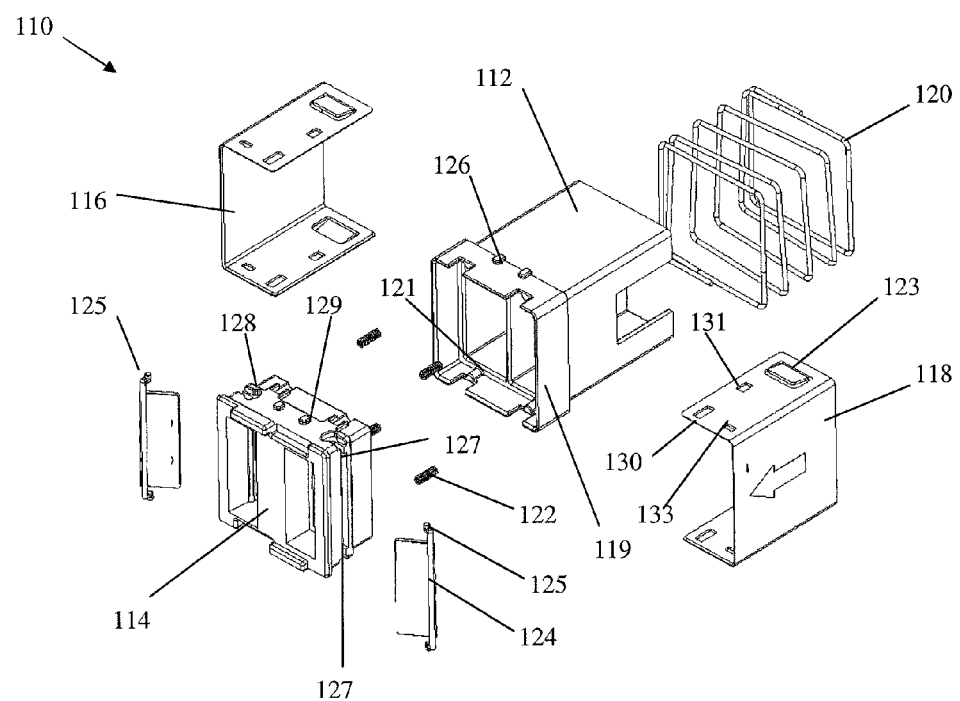
FIG. 7 is an exploded view of the shuttered front end adapter.

Referring to FIG. 7, the shroud or front end adapter 110 of FIG. 3 is shown in further detail. A front end adapter is disclosed in U.S. Pat. No. 6,832,858, which is hereby incorporated by reference. The adapter 110 includes a main body 112, actuator portion or door assembly 114, side clips 116, 118, and a main spring 120. A frame 119 is provided at the front end of the main body 112 to receive the door assembly 114, so that the door assembly moves with respect to the main body 112. The side clips have openings 130, 131 which engage the bosses 129, 126, respectively.

The door assembly 114 has doors 124, door springs 122, and bosses 129 at the top of the assembly 114. The doors 124 slide into slits 127 that are located on the sides of the assembly 114. Door hinges 125 are located on the ends of the doors 124. The door hinges 125 are received in the notches 128 located at the ends of the slits 127 and are backed up by four spring support members 121 on the main body 112 in the frame 119. The door springs 122 are received within openings located in the back side of the door assembly 114. The spring ends abut the support members 121, so that the support members 121 do not slip out of the openings in which they are situated. The support members 121 also provide added stability against which the springs 122 can push.

The hinges 125 are also received in the openings 133 in the side clips 116, 118. The hinges 125 operate with respect to the door assembly 114 moving in relation to the side clips 116, which are fixed. The door springs 122 bias the door assembly 114 away from the main body 112, whereby the doors 124 are closed. The opening 130 that receives the boss 129 is elongated, so that the boss 129 can move within the opening 130. However, the clip 116, 118 is fixed to the main body 112 by boss 126 being fixed within opening 131. Thus, the door assembly 114 can move toward and away from the main body 112. Since the door hinge 125 is fixed within opening 133 on the side clips 116, 118, the doors 124 are actuated to open and close by the movement of the door assembly 114 with respect to the main body 112. That is, the door assembly 114 is biased by the springs 122 to be apart from the main body 112. In that position, the configuration of the hinge 125 has the door 124 in a closed position, as shown in FIG. 8.

When the door assembly 114 is pressed against that bias, the door assembly 114 moves toward the main body 112. During that inward movement, the clips 116, 118 remain stationary with respect to the main body 112 because they are fixed by boss 126 and opening 131. However, the elongated opening 130 allows the boss 129 to slide inward, whereby the door assembly 114 moves relative to the side clips 116, 118 toward the main body 112. At the same time, the door hinge 125 remains fixed within the opening 133, which in turn causes the hinge 125 to rotate the doors 124 to an opened position. The travel is limited by the opening 130 and the door assembly 114 hitting the clips 116, 118 which are fixed to the main body 112.

Accordingly, the doors 124 will only open when a force is applied to the door assembly 114. This is done when the door assembly 114 is mated with the passive optical device 400. Thus, the fibers are not exposed to the surrounding environment while positioned within the adapter 110. The mating of the door assembly 114 with the passive optical device 400 forms a closed environment that prevents the fibers from becoming contaminated, thereby preventing stray particles from obstructing the optical signals as they transfer from one fiber to the next. The optical shutters doors 124 also protect the optics from damage when the passive optical connector is unplugged from the transceiver 100 and also protect users from inadvertently looking at live fibers containing laser light which could damage their eyes.

To assemble the adapter 110, the spring 120 is positioned around the back end of the main body 112. The front of the spring 120 engages the ledge created by the frame 119. The doors 124 are mounted to the door assembly 114. The door assembly 114 is then pressed into the frame 119. Once the assembly 114 is positioned in the frame 119, the side clips 116, 118 are pressed onto the side of the main body 112. As shown in FIG. 8, the bosses 126, 129 enter corresponding openings 130 in the clips 116, 118. And, the side clips 118 have flanges 123 that are angled upward from the top surface of the clip 116, 118.

The side clips 116, 118 engage the door assembly 114 with the main body 112. The clips 116, 118 also are larger than the main spring 120 so that the spring 120 can slide freely on the main body 112 beneath the clips 116, 118. The side clips 116, 118 protect the spring 120 and prevent the spring 120 from coming off of the ledge of the frame 119. As further shown in FIG. 8, the door assembly 114 has two openings 134 for receiving optical connections. In addition, tabs 136 and channels 138 are provided along the top and bottom of the front face 132 of the door assembly. These tabs provide alignment with the mating connector.

Figure 9:
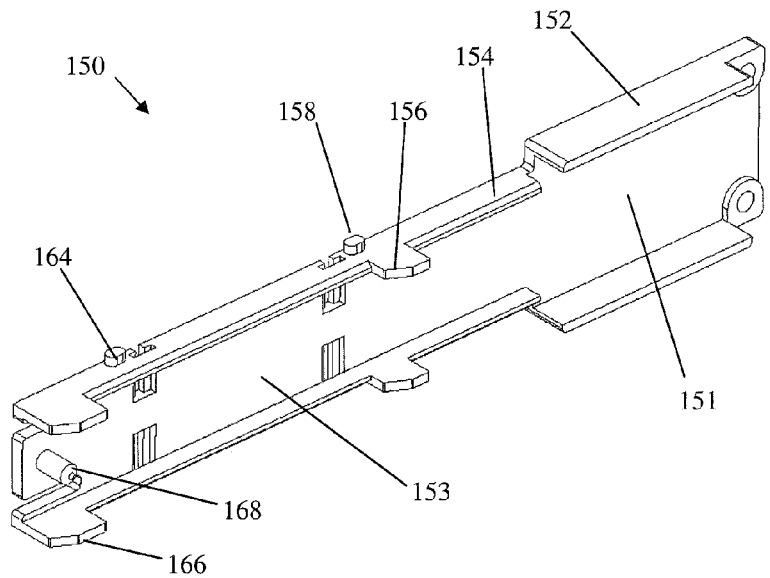
FIG. 9 is a view of the receptacle used to retain the transceiver electrical circuit board.

Turning to FIG. 9, the details of the electrical/optical receptacles 150 are shown. Here, the receptacle 150 is shown without the electrical circuit or optical elements. The receptacle 150 has an electrical receiving section 153 and an optical/electrical receiving section 151. The electrical receiving section 153 receives an electrical circuit board 172 (see FIG. 11). The optical/electrical receiving section 151 receives optical elements with electronic control elements mounted on the same electrical circuit board 172 (positioned under the cover 171 in FIG. 11). In section 177, the elements include an optical fiber assembly, driver devices, VCSEL devices, resistors, diodes, and other control circuitry and wiring.

Accordingly, the wafers 505 (FIG. 16) in the socket receive electrical signals from components on the board 7. Those signals are transmitted from the wafers 505 to the electrical circuit board 172, which in turn transmits them to the optical/electrical circuit 177. The optical/electrical circuit 177 converts those electrical signals into optical signals which are sent to the optical components associated with that circuit 177. The optical components pass the optical signals onto fibers that terminate at the end of the top portion 176 of the cover 171, and are available at the front end adapter 110. Those signals pass through the passive optical connector 400, and to the transmitting ribbon 30. The receiving ribbon 32 transmits the optical signals to the board 7 in the reverse manner, whereby they are converted by the circuit 177 into electrical signals that are sent to the board 7 via the circuit 172 and the wafers 505 (FIG. 16) in the socket 500.

Referring to FIG. 9, the side walls 152, 154 are positioned along the electrical and optical receiving sections 151, 153, respectively. A pair of front teeth 166 and a pair of rear teeth 156 extend out from the side walls 152. The teeth 156, 166 have a flat back side and a beveled front. Release bosses 158, 164 are also positioned along the side walls 154 near the teeth 156, 166. An engagement post 168 is provided toward the far side of the receptacle 150. The slots near the post 168 receive the wing portions of the T-shaped engagement projection 278 (FIG. 5) when it is actuated in the reverse direction. The wing portions of the projection 278 need clearance when the male member 270 is withdrawn.

Figure 10:
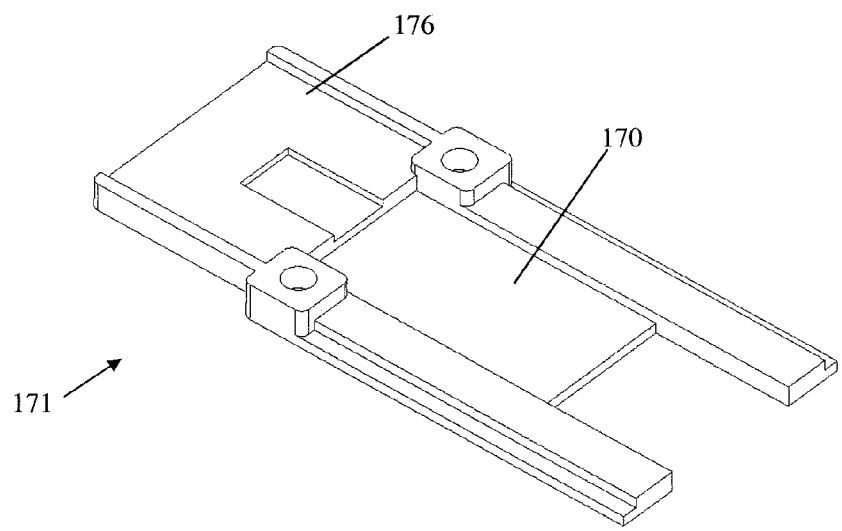
FIG. 10 is a view of the cover for the receptacle.

FIG. 10 shows a cover 171 used with the receptacle 150. The cover 171 has a base portion 170 which covers the optical/electrical circuitry 177, and a top portion 176 that covers the electrical component 172. The cover 171 functions as a heat sink that draws heat away from the optical/electronic circuitry in order to prevent damage to the VCSEL devices due to overheating. The heat is removed in two directions: through the cover 171 and through the base 150. These both pull heat into covers 203, which is finally drawn out through the panel and heat sink 536 containing multiple cooling columns on the socket 500. Referring to FIG. 3, the upper cover 171 draws heat upward and out while the lower cover 171 draws heat downward and out, in relation to the optical/electronic circuitry 177. The top portion 176 of the cover 171 extends above the receptacle 150, as well as the top portion of the circuit card 172 to form an enclosure that provides an interior space for the optical component 177. The open air framework (FIG. 4) aids in heat removal by providing a connector with open air cavities when assembled. This heat can then circulate and flow out of the connector via the heat sinks provided.

Figure 11:
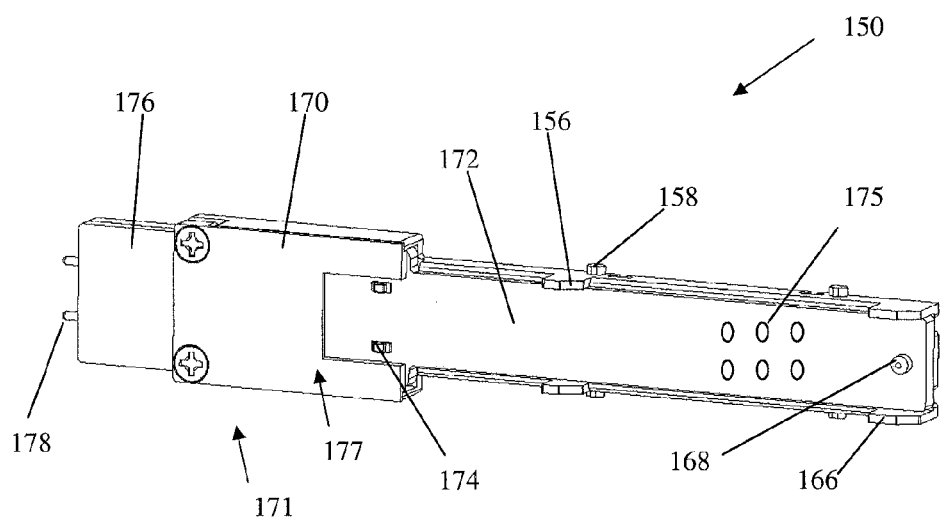
FIG. 11 is a view of the assembled transceiver device with the corresponding circuit board with exposed electrical pads.

The cover 171 is shown attached to the receptacle 150 in FIG. 11. As further shown, the electrical printed circuit board 172 fits within the channel formed by the receiving portion 153. The circuit board 172 has a number of contact pads 175 positioned along its length, though only a few are shown in the figure for illustrative purposes. The pads 175 can be formed by etching a circuit card to expose a copper layer to form the pad 175 and traces leading from the pads 175 to an electronic circuit element. The contact pads 175 can include both signal pads and ground pads, as appropriate for a given application. The contact pads 175 can also be arranged in any suitable configuration and in any suitable number other than in the manner shown.

The housing of the circuit device 172 engages the post 168 for precise registration of the circuit elements. The electrical circuit device 172 contains light elements 174, such as LEDs, which emit light that is then transmitted through a light pipe 227 on the sides of 200. This is for diagnostic purposes only to show if the circuit is powered up properly. The light pipe 227 provides a means that the user can see the LED emitted color when looking directly parallel to the faceplate. The optical/electrical device 172 can either be configured to receive, to transmit or to both transmit and receive. Although the optical/electrical circuit device 172 is shown in this embodiment to be an optical connector, the device 172 can also be configured to contain no optics. The connector could be a pure electrical connector with a high speed coaxial cable connector replacing the passive optical connector 400 and a high speed electrical cable connector mating partner replacing front end adaptor 110. In this fashion, no optics would be involved yet the overall package would remain similar in shape and size with no change occurring on the socket side.

In the preferred embodiment, the circuit device 172 in one of the receptacles 150 (FIG. 3) is a receiver and the other is a transmitter, so that the device both transmits and receives optical signals to/from the respective ribbons 30, 32. This provides a savings in space (density on the front panel) and eliminates the need for customers to order separate modules. The end alignment pins 178 extend out of the top portion 176 of the cover 171. These pins 178 receive the mating optical connector and provide precise alignment during fiber coupling.

The circuit devices 172 are fitted within a single housing 200, in a back-to-back arrangement. However, it should be appreciated that the number of circuit devices 172 is exemplary only, and is not intended to be limiting. There may be more or less circuit devices 172. The connector could be configured for one or many circuit cards without deviating from the overall invention. In the current configuration, the device contains a 12 fiber parallel array of transmit or receive signals, but the devices could be configured to contain four 4 fiber devices, one four fiber transmit and one four fiber receive per card, with the four fibers left unused per card. This is just one of many possible arrangements in order to illustrate the flexibility of the overall system.

Figure 12:
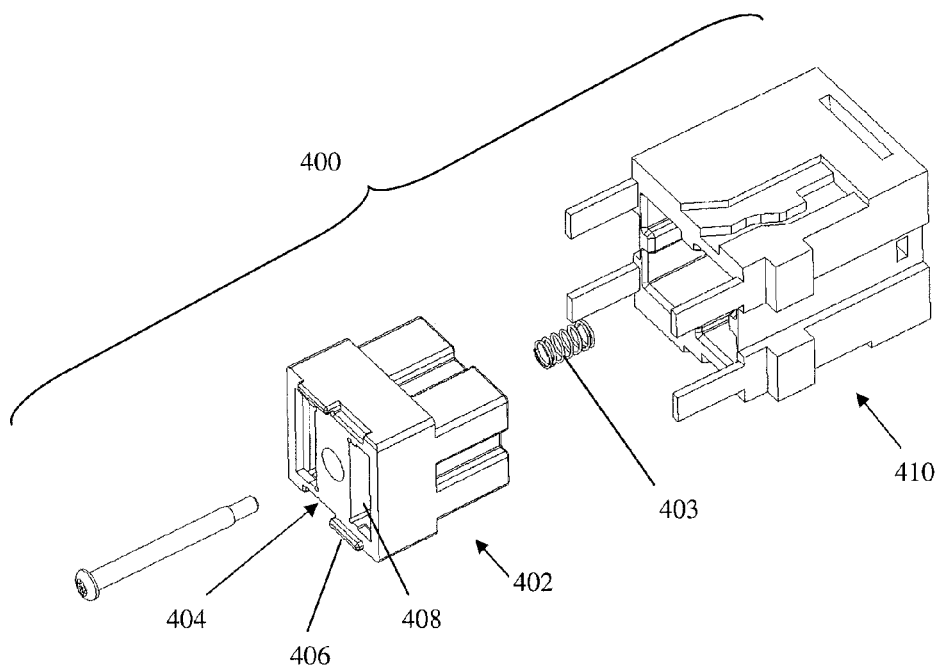
FIG. 12 is an exploded view of the passive optical connector.
Figure 13:
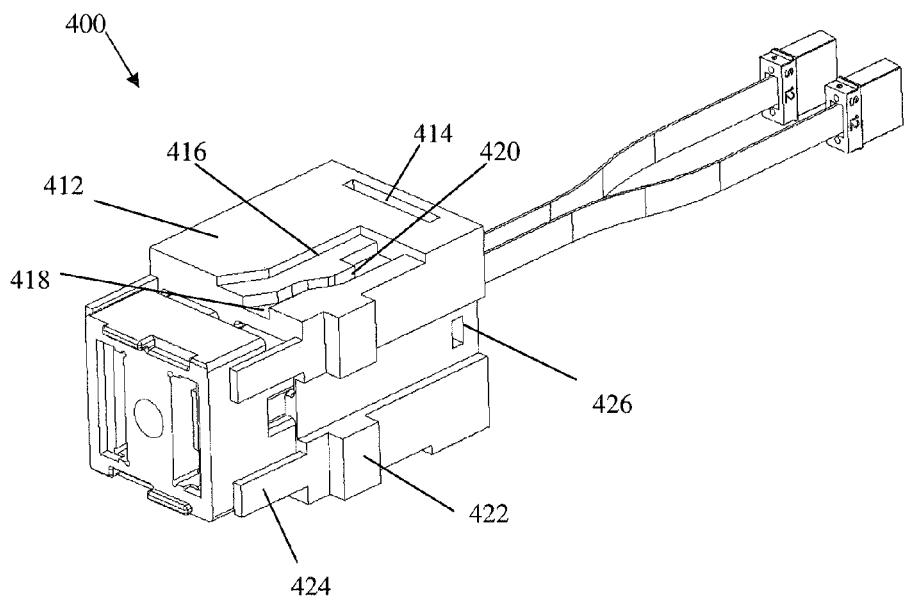
FIG. 13 is a detailed view of the assembled passive optical connector.
Figure 14:
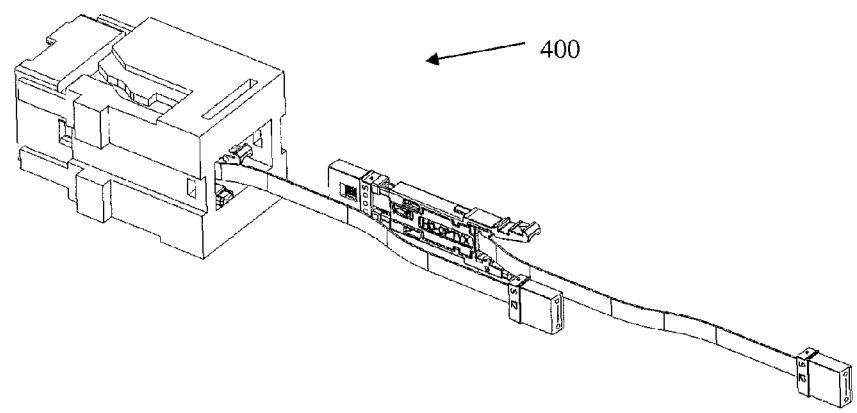
FIG. 14 is a view of the rear of the passive optical connector showing the connection of the optical connectors.

Turning to FIGS. 12-14, the passive optical connector 400 of FIGS. 1 and 2 is shown in greater detail. The optical connector 400 has a housing member 410 and a shroud member 402. The shroud 402 has two openings 408, each one receiving an optical ferrule. The top and bottom of the front face of the shroud member 402 has channels 404 and tabs 406. The channels 404 and tabs 406 of the ferrule member 402 engage respective channels 138 and tabs 136 of the front end adapter 110 of the transceiver 100, so that the passive optical connector 400 is properly aligned with and engages the transceiver 100. The passive optical connector 400 is passive because the optics are simply a pipe and do not modify the optical signals. The transceiver device 100, on the other hand, has electronic circuitry making it active when it is mated.

The shroud member 402 is connected to the housing 410 by a screw that extends through the shroud 402 and into the housing 410. A channel in the sides of the shroud 402 cooperates with a rail projection on the inside of the housing member 410 to align the shroud 402 with the housing member 410 as the shroud 402 is slidably received in the housing member 410. A spring 403 is positioned between the housing member 410 and the shroud 402 to provide some compliance between those elements. This compliance allows the ferrules held within housing 410 and 402 respectively, to be exposed during mating so that they may reach the corresponding optical assembly card 177. Spring 403 is used to bias the housing member 402 forward. This is done since the doors on housing 110 must be activated prior to the ferrules making internal contact with the transceiver device 150 containing the alignment pins 178. Therefore the spring 403 must be strong enough to overcome the springs 122 contained within the adapter 110 which actuate the doors. Otherwise the doors would not open and the ferrules would stub against the opposing part 110. The passive connector 400 is not provided with doors. Instead, a dust cap is used to cover the shroud 402. The dust cap is removed just prior to the ferrules being plugged into the shroud 402, so that doors are not needed. Of course, doors can be provided if needed for a particular application.

Figure 15:
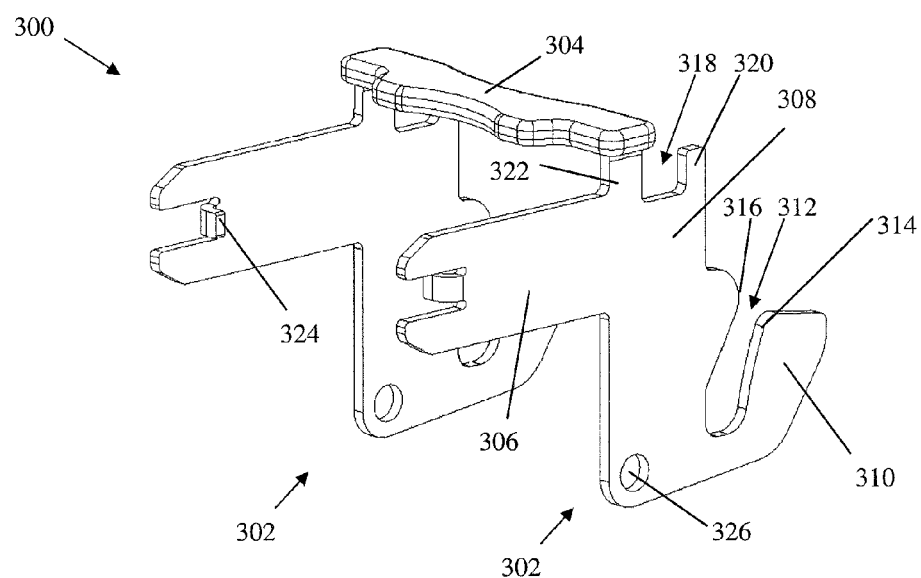
FIG. 15 is a detailed view of the latching mechanism.

Turning momentarily to FIG. 15, the latching mechanism 300 is shown in greater detail. The latching mechanism 300 is utilized to lock the passive optical connector 400 to the transceiver 100 and to decouple the transceiver from socket 500. The latching mechanism 300 generally has two flat side panels 302 that are connected together by a handle 304. The side panels 302 have identical shapes and extend parallel to and opposite from one another. This configuration allows the latching member 300 to fit over the transceiver 100. The handle 304 can then be used to manipulate the latch 300 with respect to the passive optical connector 400 and the transceiver 100.

The side panels 302 each have a base section 308 and an arm section 306 that extends substantially perpendicular from the base 308 to form an L-shape. A peninsula 310 is formed at the bottom of the base 308 to extend outward at an angle from the base 308. The peninsula 310 has an inner corner 314 that faces a guide member 316. The guide member 316 is formed along the side of the base 308 that faces the peninsula. The guide 316 extends outward from the base 308 such that the leading edge of the guide is a sloped ramp and the back edge of the guide 316 is curved. The peninsula 310 and guide 316 cooperate to form a guide slot 312 therebetween.

Another receiving slot 318 is formed at the top of the base 308, surrounded by upright members 320, 322. One of the upright members 322 engages the handle 304. A finger 324 is formed at the end of each arm 306 as a small cutout that is bent inwardly toward the other respective side panel 302. An opening 326 is formed at the bottom corner of the side panel 302 opposite the peninsula 310.

As shown in FIGS. 3 and 6, the latch 300 is secured to one of the rear corners of the housing 200 of the transceiver 100 about a pivot 228 (also see FIG. 4) that extends through the opening 326 and into the housing 200. The pivot 228 permits the latch 300 to pivot about the housing 200 between an open position (FIG. 24) and a locked position (FIG. 1). In addition, a boss 226 is provided that extends upright from the top surface of the cover 203. The boss 226 engages the guide member 316 and the peninsula 310 and is removably received in the guide slot 312. The second guide boss 220 (also see FIG. 4) operates within the receiving slot 318 of the latching mechanism 300. The boss 220 contacts the upright stop member 320 to prevent the latch 300 from rotating to the release position without some additional effort, sort of a soft lock. As the front end adapter 110 pulls on the cover 203 by the flanges 123 engaging catches 211, it rotates the latch 300. The guide boss 220 prevents the adapter 110 from pushing forward too far.

Returning to FIG. 13, the housing member 410 has a top surface 412. A first channel 416 is formed in the top surface 412. The first channel 416 is configured to receive the arm 306 of the latching mechanism 300, as shown in FIGS. 1 and 2. The channel 416 allows the arm 306 to be flush with the top surface 412 of the housing member 410, and the channel lip prevents the arm 306 from rotating out of the channel 416. A second channel 418 is formed within the first channel 416 to receive the finger 324 of the arm 306 of the latch 300. The second channel 418 guides the latch arm 306 by forcing the finger 324 to follow the contour of the channel 418.

The passive optical connector 400 also has a side with alignment members 424. Stops 422 are also provided on the side of the connector 400, and a channel 426 is formed between the stops 422. The channel 426 allows the light emitted from the light pipe 227 to pass without being blocked so that the light from the pipe 227 can be viewed from the front of the device, as best shown in FIG. 2. An opening 414 is also provided at the leading end of the connector 400. This opening 414 provides a ledge for the ferrule carrier latches seen in FIG. 14, to seat against and lock.

As shown in FIG. 14, optical ferrules are connected to both ends of a ribbon cable which can be inserted into the opening in the back of the optical connector 400. The preferred embodiment uses ribbon fibers within the housing. However, the design does not limit itself to this sort of fiber only. Other cabling means could be used while falling within the scope of the invention.

By having the latch 300 and the optical connector 400, the user can repair only the portion of the assembly 5 that is defective. The user can elect to remove only a single cable 30, or the passive optical connector 400. The passive optical connector 400 must be removed from the connector assembly 5 prior to installing the transceiver plug 100 into the socket 500. This is because the boards 172 must move during installation, which would cause the ferrules in assembly 400 to crack if they were still attached.

In an alternative embodiment of the invention, the cable 30 can be directly connected to the transceiver 100, such that the latch 300 and passive optical connector 400 are eliminated and the front end adapter 110 is removed from the assembly and the ferrules are directly attached to the plug and a covering is provided around the back to close off the opening. However, the preferred embodiment is to have the latch 300 and optical connector 400 to facilitate the maintenance and repair of the connector assembly 5.

Figure 16:
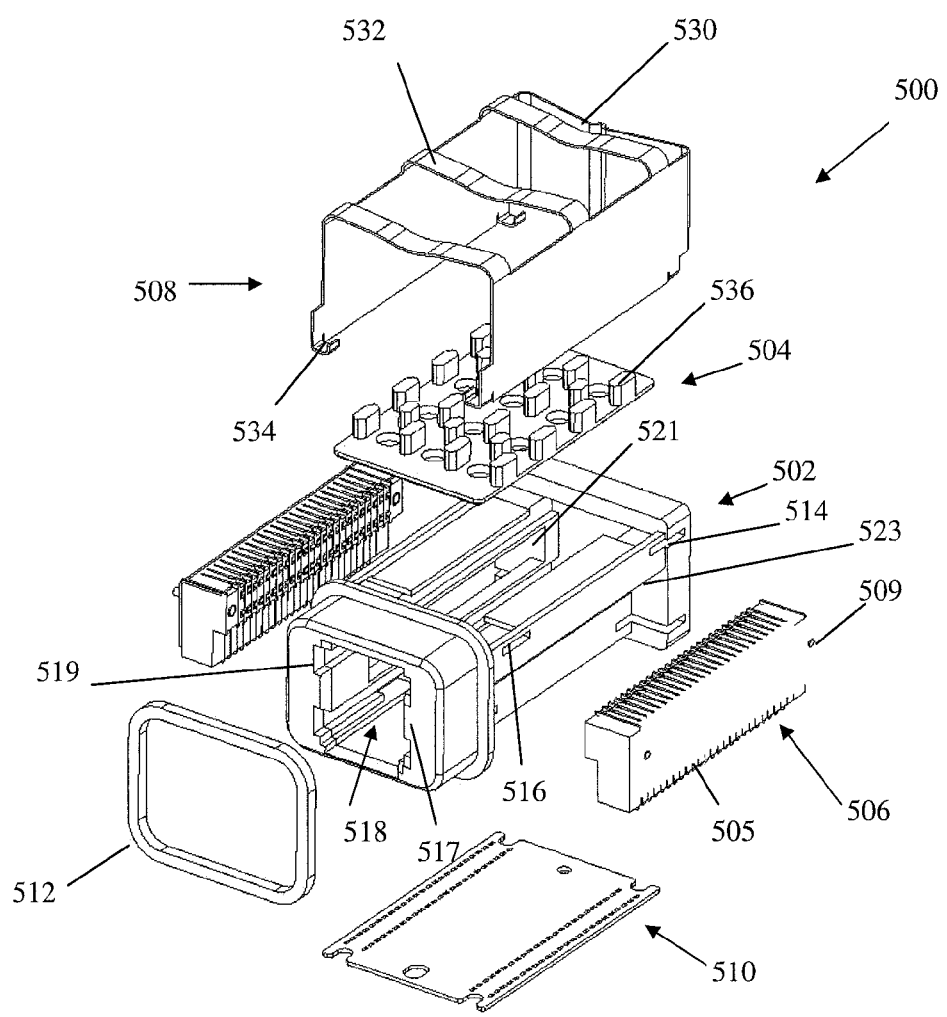
FIG. 16 is an exploded view of the electrical socket that is received in the panel.

FIG. 16 shows the electrical socket 500 of FIG. 1 in greater detail. The socket 500 has a body 502, heat sink 504, electrical connector assembly 506, clip 508, tail organizer 510, and gasket 512. The body 502 has various slots 514, 516, and an opening 518 extending through the center of the socket body 502. The clip 508 has a spring back 530, leaf springs 532 connecting the sides of the clip 508, and engagement prongs 534. The electrical connector assembly 506 is shown in greater detail in FIG. 18, where individual wafers 505 are placed side-by-side with end caps on the ends. A stiffener is used to hold the wafers 505 together, yet permit some vertical movement of the individual wafers 505 due to the action of the spring fingers 513 that bias the wafers 505 downward into the board 7. The end caps have an opening 509 that receive a post on the plug body 168 to align the connector assembly 506 with the board device 172.

Figure 18:
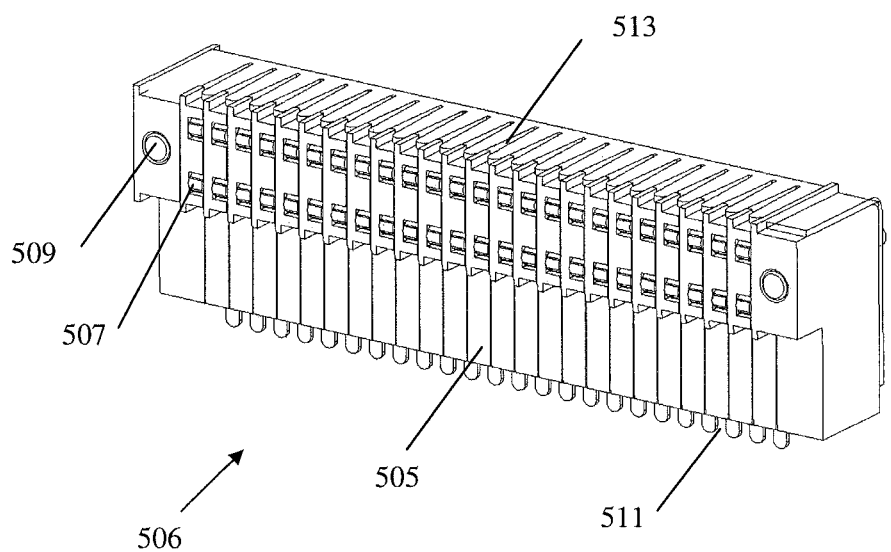
FIG. 18 is a view of the assembled electrical wafers.

Still referring to FIG. 18, each individual wafer 505 has contacts that extend through the wafer 505. The contacts have one end that form male prongs or tails 511 that mate with the tail organizer 510 (FIG. 16). The tails 511 contact to the daughter card 7 (FIG. 1) and can be press fit or soldered to the card. At the opposite end of the contacts are curved contact ends 507 or pins that project slightly from the front of the wafer 505. The contacts ends 507 mate, both physically and electrically, with the electrical circuit card pads 175 on the circuit device 172 (FIG. 11). The wafers 505 receive signals from the daughter card 7 that the socket 500 is mated on. When the wafer 505 receives a signal from the daughter card 7, the signal enters at the tail 511 via a solder connection on the daughter card. The signal passes through contacts 507 to the contact pads 175 of the circuit card 172.

The signal then travels through the circuit card 172, which passes the signal to the optical/electrical circuits 172, 177. The optical/electrical circuit card, in turn, changes the electrical signal to an optical signal and puts the optical signal onto optical fibers that are present at the end of the top portion 176 of the receptacle 150. The optical signals are sent out as light via the optical fibers. The optical fibers in the transceiver 100 mate with the fibers in the ribbon cable 30 in the passive optical device 400. In addition, the LEDs 174 (FIG. 11) on the electrical circuit 172 indicate whether or not the circuit 172 and daughter card are operating properly. For example a green light could indicate proper operation and a red light would indicate an error.

Returning to FIG. 18, spring projections 513 are located on the top of each wafer 505 to bias the wafer 505 in a downward direction prior to soldering. The springs 513 push up against the ledge 523 in the body 502 in which the slots 514, 516 are formed (FIG. 16). This permits the wafers 505 to move up and down in the stiffener. Thus, when the original socket device is placed on the daughter card, any imperfections in flatness or any height differences from wafer to wafer in the socket assembly will be adjusted by the travel that these spring fingers 513 allow in the vertical direction. The individual wafer level hold down force overcomes coplanarity and flatness requirements of an assembled electrical connector against a circuit card during surface mounting.

The springs 513 also insure that the solder joints are all consistent and free from residual stresses which often occur when flatness is difficult to achieve. This movement enables for more consistent solder joints without heavy compressive loading prior to soldering. Less downward force is required on the device overall when it is originally soldered in an attempt to create a flat tail lead section. This means that no special pick and place machinery is required in order to secure the wafers 505 to the board 7.

The socket 500 is assembled by engaging the electrical connector assembly 506 with the tail organizer 510. The tail organizer 510 captures the tails of the individual wafers 505 of the assembly 506 and prevents those tails from shifting, such as due to the force of the leaf springs 532 or the spring back 530. This ensures that the leads 511 align with their appropriate solder pads on the daughter card 7 and do not cross over, thereby causing shorts or opens with neighboring pads. The combined tail organizer 510 and connector assembly 506 are placed against the main body 502, and fit in the corresponding side chambers.

The heat sink 504 is then placed on the top of the body 502. The clip 508 is then placed over the top of the socket 500 so that the sides of the clip 508 extend down over the connector assembly 506 to keep the assembly 506 in place. The engagement prongs 534 of the clip 508 enter openings in the tail organizer 510 so that the clip 508 is locked in place, which also locks the heat sink 504, connector assembly 506 and tail organizer 510 to the body 502. It is also possible to attach the engagement prongs 534 directly to the socket body itself to provide additional rigidity and allow the tail organizer to be removed or installed once the clip has been assembled. The gasket 512 is then placed about the front end of the body 502.

Figure 17:
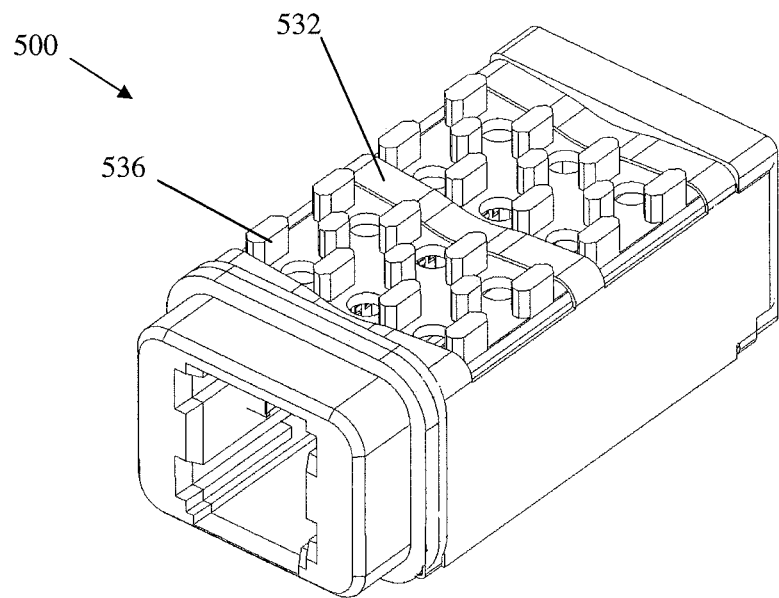
FIG. 17 is a view of the assembled electrical socket.

The assembled socket 500 is shown in FIG. 17. As shown, the leaf springs 532 extend between the rows of projections 536 on the top of the heat sink 504. The leaf springs 532 apply a downward pressure to the heat sink 504, but allow the heat sink 504 to raise up. The heat sink 500 pulls heat out of the plug 200 when it is mated to socket 500 and the projections 536 facilitate dissipation of the heat into the environment by increasing the overall surface area. Heat is passed from the receptacle 150 (FIG. 9), cover 171 (FIG. 10), and cover 203, to the heat sink 504. The circuit 177 is placed in the center depression to draw heat into the cover 203. Accordingly, the heat sink 504, as well as the receptacle 150 and cover 203 are preferably made of a metal to draw heat away from the device.

The assembled socket 500 is slidably received in an opening on the panel 20 (FIG. 1). The socket 500 is soldered to the panel 20.

Assembly of the Transceiver 100

To assemble the transceiver 100, the cover 203 (FIG. 6) is placed onto the body 240, 250. The receptacles 150 are then inserted through the main body 240 into the male member 250, as shown in FIG. 3. Referring momentarily to FIG. 19, the receptacles 150a, 150b are positioned back-to-back within the male member 250. The circuits 172 face outward so that the pads 175 can be accessed through the side windows 253 (FIG. 4.). Springs 173 are positioned to extend between the receptacles 150a, 150b, and are biased to force the receptacles 150a, 150b outward against the beams 252. As shown in FIG. 20, the springs 173 connect to a nub 162 located within a recess 160 in the inside-facing surface of the receptacles 150a, 150b.

The springs 173 compress to permit the receptacles 150a, 150b to be pressed together as the receptacles 150a, 150b are inserted into the body 240, 250. The receptacles 150a, 150b are assembled using a removable clip that prevents them from coming apart. The ramps 264, 268 on the covers 203 compress and release the boards 150 as they are inserted into the male member 250 until the boards 150 are fully mated. Specifically, as the receptacles 150a, 150b are inserted into the body 250, the front bosses 164 (FIG. 9) engage the first set of ramp members 264 (FIG. 5). The bosses 164 ride along the ramps 264, which presses the receptacles 150a, 150b inward against the bias of the springs 173 so that the post 168 avoids contacting the walls of the male body 250. At the end of the ramps 264, the bosses 164 allow the receptacles 150a, 150b to return to their outward position under force of the springs 173. The ramps 268, 276 allow the boards 150 to retract when the latch mechanism 300 is engaged. The leading bosses 164 reach the next set of ramps 262 at the same time the rear bosses 158 reach the first set of ramps 264. The receptacles 150a, 150b compress inward so that the teeth 156 do not contact the walls of the main body 250. The bosses 158, 164 have a beveled leading edge, so that they smoothly engage the ramps. Thus, the circuit cards float within the transceiver 100. The circuit cards 172, 177 can also be easily changed to alter the style and/or functionality of the connector.

When the receptacles 150a, 150b are fully inserted, as in FIG. 19, the bosses 158, 164 are aligned with the stops 274, 266. Thus, when the connector 200 is inserted into the socket 500, the stops 274, 266 prevent the bosses 158, 164, as well as the receptacles 150a, 150b, from being compressed inward. Accordingly, the contacts of the wafers 505 can press firmly on the pads 175 of the circuit board 172 to achieve a reliable and firm connection.

Inserting into Socket

To connect the front end mating connector 10 with the socket 500, the fully-assembled male member 250 of the transceiver 100 is inserted into the socket 500. The front end 257 of the male member 250 has a recess 261 (FIG. 4). In addition, the front of the main body 502 of the socket 500 (FIG. 16) has a projection member 517 which defines two recessed notches 519. The front teeth 156 engage the side wall of the main body 502 at the notches 519. The side wall of the notches 519 push the teeth 156 inward, with respect to the male portion body 250, so that the circuit boards 172 and the receptacles 150 get pushed inwardly toward each other against the force of the springs 173. The bosses 158, 164 are in front of the stops 274, 266 away from the body 209, such that when it is fully inserted the bosses move forward (as shown in FIG. 19). Thus, the front end of the receptacles 150a, 150b are pressed together, so that the boards 172 do not get damaged by the projection 517 as the male member 250 is received in the opening 518 of the socket 500.

The male member 250 continues to be received within the socket 500. The front teeth 166 are longer than the rear teeth 156, so that the front teeth 166 do not enter the initial slot 516 of the projection 517. Instead, the projection 517 continues to depress the receptacles 150a, 15b. As the receptacles 150a, 150b continue to be inserted, the rear teeth 156 are configured to engage the notches 519, to squeeze the rear end of the receptacles 150a, 150b together. At this point, the entire length of the receptacles 150a, 150b are pressed inward. As the receptacles 150a, 150b are further received in the socket 500, the teeth 166, 156 reach the slots 514, 516, respectively. The teeth 166, 156 fall into the slots 514, 516 under the force of the springs 173. At that point, the circuits 172 can fully seat up against the contacts 507 of the wafers 505, which are positioned within a window 521 at the projecting bar 517.

The teeth 156, 166 serve two purposes. One is to prevent the electrical contacts of the electrical wafers 505 from wiping across all of the electrical pads 175 on circuit cards 172. The other is to allow the post 168 to enter the corresponding hole 509 (FIG. 18) in the wafer assembly 506, which retains the plug assembly 100 in the socket assembly 500.

The stops 274 (FIG. 5) are secondary locks for the electrical socket connector. They insure that the receptacles 150a, 150b compress with a consistent forward mating force when the connector is fully inserted. In this way, even though the circuit cards 172 float in relation to the male portion 250 as the receptacles 150a, 150b are being inserted in the socket 500, they are fixed in relation to male portion 250 when fully mated. When the user manually operates the latch to a locked position, or when the optical cable is installed (which requires the latch to move to the forward position of FIGS. 22, 23), the stops 274 wedge behind the bosses 164, 158 to prevent the receptacles 150a, 150b from being withdrawn and from being compressed together.

Operation of the Connector Assembly

The use of the connector assembly 5 will now be described. The connector assembly 5 is brought together at the panel 20 by starting with the fully constructed transceiver 100 (FIG. 21) with the receptacles 150 and the front end adapter 110 installed. The boss 220 is a soft lock that holds the latch 300 in the fully engaged position while the transceiver is installed. Referring back to FIG. 1, the connector assembly 5 is assembled first to the panel 20, and then the daughtercard 7 is attached to the panel 20. The transceiver 100 is then inserted into the socket 500. The insertion is into the front face of the panel 20 in a direction that is substantially perpendicular and inward with respect to the front face of the panel 20, as generally represented by the arrow A of FIG. 1. Though a panel 20 is shown in the embodiment of FIG. 1, the panel 20 can be a PCB, a faceplate, adapter, or other module.

The socket 500 (FIG. 16) receives and engages the male member 250 of the transceiver 100 (FIG. 6). The male member 250 slides into the socket opening 518, as the socket 500 is positioned within the panel 20 (FIG. 1). The sides of the opening 518 press the teeth 156 inwardly. This allows the device cards 172 to move inward within the male member 250 so that they are out of the way of the electrical contacts on socket 506. The inward motion is substantially perpendicular to the insertion direction A of the transceiver 100, and is generally shown in the embodiment of FIG. 1 as being opposite the direction of arrows B, C for the respective boards 172. That prevents the cards 172 and the pads 175 from becoming damaged by each other or other features of the device. It also prevents multiple system interruptions or damage due to the progressive starting and stopping of every lead across every pad where the contacts are allowed to engage. It also avoids degradation of the circuit card surface and pad condition.

As the male member 250 is received in the opening 518, the teeth 156 engage the slots 514, 516 to lock the transceiver 100 to the socket 500. When the connector is fully received in the socket 500, the boards 172 move into an operating position. That is, the boards 172 move outwardly with respect to the transceiver 100, in a direction that is substantially perpendicular to the insertion direction A of the transceiver 100 and parallel to the front surface 22 of the panel 20, as generally represented by arrows B and C for each of the respective boards 172. Once the boards 172 are in the operating position, the contacts 507 of the wafer assembly 506 are pressed against the boards 172 on the receptacles 150 to establish an electrical connection therebetween. This causes the circuit 172 to power up and the LEDs 174 to light. The light is transmitted through the light pipe 227 to the front face of the transceiver 100, when the daughter card is live. In addition, as the male member 250 is received in the opening 518, the male member 250 forces the heat sink 504 upward against the force of the leaf springs 532. This ensures a connection between the heat sink 504 and the cover 270 of the male member 250 so that heat can transfer from the receptacles 150 to the heat sink 504.

Accordingly, the wafers 505 face, and their contacts 507 extend outwardly, in a direction that is substantially perpendicular to the boards 172 and the contact pads 175, but which is parallel to the front surface 22 of the panel 20. The contacts 507 are located internal to the panel 20, and not on the surface 22 of the panel 20. The contacts 507 and the pads 175 extend along axes which are perpendicular to the front surface 22 of the panel 20, and parallel to the longitudinal axis of the front end connector 10. The contacts 507 also do not extend outwardly from the surface 22 of the panel 20, and the contact pads 175 are not located on the leading face of the front end connector 10. Thus, the number of contacts 507 and pads 175 can be increased by increasing the depth of the panel 20 and length of the male member 250, respectively, without increasing the height and width of the socket 500 or the front mating connector 10, and without requiring addition space at the front surface of the panel 20. In this manner, the density of the device can be increased without increasing the size of the front surface 22 of the panel.

In this configuration, the connector 506 is composed of a series of individual connectors that are either signal contacts, ground contacts, or power contacts. These various contacts all mate simultaneously in this design but could be just as easily be staggered by allowing greater beam deflection of the varying contact types in 506.

Because the contacts 507 are not located on a surface parallel to the front panel 22, but rather are perpendicular to the surface of the panel 22, the connector 10 must move in two directions in order to engage those contacts 507. If it was engage in a singular first direction, then the first electrical pad on board 172 would make contact and wipe across all of the corresponding contacts in connector 500. This means that the product would electrically short as it is inserted since the power contact and signal contacts would make connection with the ground contacts.

Referring to FIG. 1, the connector 10 is first inserted into the socket 500 in the direction of arrow A into the face of the panel 20. In order to prevent the boards 172 from being damaged during that insertion, the boards are retracted inwardly within the male member 250. Consequently, the boards 172 must then move outwardly in the direction of arrows B and C, respectively, in order for the pads 175 on the boards 172 to engage the contacts 507 of the wafers 505. This two-part motion ensures a good connection between the contacts 507 and the pads 175. Of course, other suitable alternatives will become apparent. For instance, the boards 172 can remain retracted within the male member 250, and the wafer contacts 507 can move into the male member 250 to engage the pads 175.

The leading end of the male member 250, and more specifically the T-shaped engagement projection 278, pushes against the back wall 530 of the clip 508 (FIG. 16). This provides an ejection force against the connector 200, and more specifically against the cover boss 226 (FIG. 6), which forces the latch mechanism 300 toward the passive connector 400. This force creates a self-locking mechanism when the passive connector 400 is installed against the connector 200, meaning that the latch fingers 324 will automatically seat when the proper distance is achieved.

Furthermore, the back wall 530 provides an outward force against the connector 200 when the latch mechanism 300 is engaged to remove the connector 200 from the socket 500, causing connector 200 to be ejected when the teeth 166 and 156 have been retracted sufficiently far to unlock the connector. When the connector is removed, the cover 203 moves forward, and the gap between the recessed edge 224 and the brace 202, as shown in FIG. 6, is narrowed. However this cannot occur until the connector 400 is fully removed which allows the latch 300 to move more freely forward and back. It is not possible to remove the transceiver 100 with the passive device 400 in place and the stops 422 aid in preventing any possible latch rotation.

FIG. 6 shows the transceiver 100 as it would appear when fully received in the socket 500. The latching mechanism 300 is set so that the arms 306 face forward. This is a secondary locking position due to the boss 220 against the brace 202. Referring to FIGS. 1 and 22, the passive optical connector 400 is then slidably connected to the transceiver 100. The mating face of the front end adapter 110 (FIG. 3) is aligned with the mating face of the shroud 402 (FIG. 12), using the respective tabs 136, 406 and channels 138, 404. The connector 400 is then pushed onto the transceiver 100. This compressive motion causes the door assembly 114 to move toward the main body 114 of the adapter 110 due to the lighter internal spring force of the door springs 122 as compared with the spring 120, which opens the doors 124.

As the passive connector 400 continues to be applied to the transceiver 100, the spring 120 begins to collapse and the optical assemblies 177 extend to the openings 134 (FIG. 8). The spring 403 (FIG. 12) also begins to collapse, allowing the ferrules 30, 32 within the shroud body 402 to move forward into the openings 408 to couple with the optical assemblies 177. The alignment pins 178 (FIG. 11) align the ferrules 30, 32 with the optical assemblies 177. The ferrule carrier shown in FIG. 14 has two internal springs which provide a compressive force against the ferrule end face during mating. This ensures that the signals are firmly connected so that the signals can be properly transferred and won't separate under temperature fluctuations or changes due to vibrations. The assembly then travels a short distance further to allow the latch to connect to the locking surface on connector 400. This causes some over-travel in the ferrule and the ferrules return to the original mated position. This maximum over-travel bottoms the protruding arms of the adapter body 410 against the cover slots 224 (FIG. 5) so the protruding arms form a gap once the connector latch fully engages. As the arms 306 of the latch 300 rotate, they cause the protrusion 316 to drive the cover 203 into a locked position in order to provide a constant mating force on the electrical contacts. In the locked position, the bosses 158, 164 are aligned with the stops 266, 274 so that the boards can't compress. At full engagement, the latch mechanism 300 locks in place, and is retained by the two protrusions 324 on the latch 300.

As the optical connector 400 approaches the transceiver 100, the alignment members 424 (FIG. 13) enter channels in the side of the transceiver housing 200 to ensure proper alignment of those elements and permit the connector 400 to properly engage the transceiver 100. As the transceiver 100 further approaches the connector 400, the latch arm 306 (FIG. 15) and latch finger 324 enter the first and second channels 416, 418, respectively. The latch handle 304 can be operated to further align the latch arm 306 with the channel 416, though this should not be necessary. The handle 304 is primarily utilized to ensure that both of the side panels 302 operate in a simultaneous and parallel fashion.

The channel 416 and the arm 306 are both angled to provide sufficient clearance for the arm 306 to enter the channel 416 from the downward biased position. Those angled portions also guide the latch arm 306 into the channel 416. The latch arm 306 is biased downward with respect to the optical connector 400 (that is, into the connector 400) by the boss 226 contacting the guide 316. The second channel 418 guides the latch finger 324 against the bias until the lip 420 is reached. As the latch 300 moves upward, the pushing action forces the guide 316 to push the boss 226 back against the spring action of the clip back 530, which forces the cover forward to compress the back 530, as shown in FIG. 22. The spring back 530 is most compressed when the latch 300 is just about to lock, such that the arms 306 are at an upward rotation causing the guide 316 to push on 226 which in turn pushes on the spring back 530.

The connector 400 continues to be slidably received by the transceiver 100. After the finger 324 passes the lip 420, the bias action forces the finger 324 into the lip 420 which moves downward under operation of the bias action. The spring back 530 drives the cover 203 backward, which rotates the latch 300 up (in the embodiment of FIG. 22). Once the finger 324 is engaged with the lip 420, the finger 324 and lip 420 function to lock the connector 400 with the transceiver 100, as shown in FIG. 23.

Once the transceiver 100 and connector 400 are engaged, they remain locked together. To disengage the connector 400 from the transceiver 100, the latch handle 304 is pushed downward (in the embodiment of FIG. 23) toward the panel 20 (FIG. 24). The latch 300 rotates about the pivot 228 so that the latch arms 306 come up and the latch finger 324 raises beyond the lip 420 of the connector 400. The connector 400 can then pull away from the transceiver 100 until they are fully separated. Once the latch finger 324 is free of the lip 420, the spring 120 forces the connector 400 apart from the transceiver 100. The spring 120 is compressed by the front end adapter 110 when the transceiver 100 is connected with the connector 400. Accordingly, once the latch finger 324 is freed, the spring 120 forces the front end adapter 110 to push against the connector 400, thereby moving the transceiver 100 away from the connector 400.

The downward movement of the latch 300 also compresses the spring back 530. The combined force of the spring 120 of the front end adapter 110, the spring of the ferrules, and the springs 403 and 530, cause the passive optical connector 400 to self-eject from the transceiver 100. Once the passive connector 400 ejects, the door assembly 114 returns to its normal position under force of the spring 120, and the doors 124 close. Additionally, the internal door assembly 114 pull the side clips 116, 118 to their unlocked state, which releases most of the pressure exerted by the spring back 530.

In addition, when the latch 300 is pulled backward toward the user (to the left in the embodiment of FIG. 1), the cover 203 moves backward, which causes the bosses 164, 158 to interact with the cover ramps 268, 276. The ramps 268, 276 then makes each card 172 withdraw and compress together in the center of the male body 250. The teeth 156, 166 move into a free position and also disengages the locking boss 168 from the opening 509 of the socket 500 end modules. This prevents the contacts 507 of the wafers 505 from rubbing on the pads 175 on the way out. Since the spring back 530 is compressed, there will be a slight ejection of the connector 100 from the socket 500 assuming the friction of the cover in relation to heat sink 536 is not that great.

Figure 26:
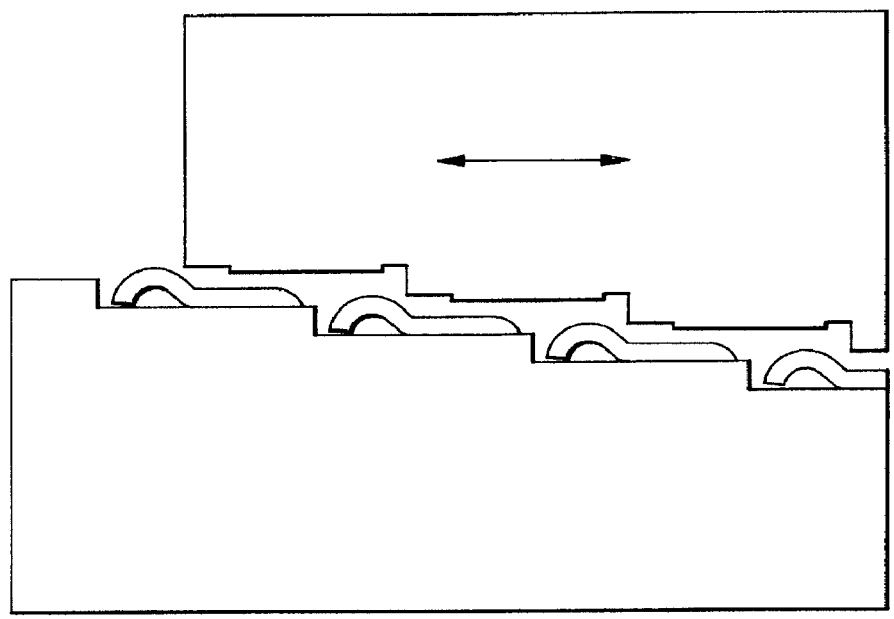

Alternative embodiments of the invention are shown in FIGS. 25-31. Turning to FIGS. 25(a)-(d) and 26, a single motion can be provided by configuring the connector 10 or socket 500 so that the boards 172 do not scrape while being inserted into the socket 500. This could be done, for instance, by having a pyramid shaped stepped socket 600 (socket housing not shown) and a stepped connector (602) on the board 172 to interface with the socket. A contact is positioned at each step, so that each contact of the board is aligned with a respective contact of the socket. This could also be done by creating a wedged shaped connector which mates to a wedged shape socket such that the wedges align only at the last minute of mating. Accordingly, all of the contacts of the socket connect with all of the contacts of the board at the same time, as shown in FIG. 26.

Figure 27A:
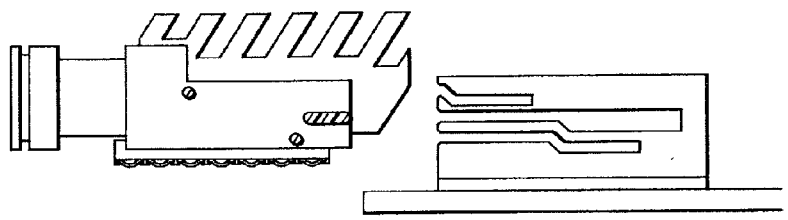
FIGS. 27(a)-(d) show another alternative embodiment of the invention.

It should therefore be apparent that that assembly 5 provides a front-pluggable approach to connection where the connector can mate in a variety of fashions beyond those shown. For instance, the socket can be placed on the card such that the face is parallel to the card and an LGA (Land Grid Array) approach is provided which again would require a bi-directional travel, as shown in FIGS. 27(a)-(d). As shown in FIG. 27(a), a first elongated boss and second and third circular bosses project outward from the outside of a male connector member. The bosses each engage a respective channel in the side of a socket that slidably receives the male connector member.

Figure 27B:
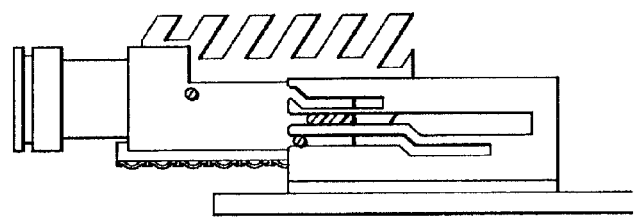
Figure 27C:
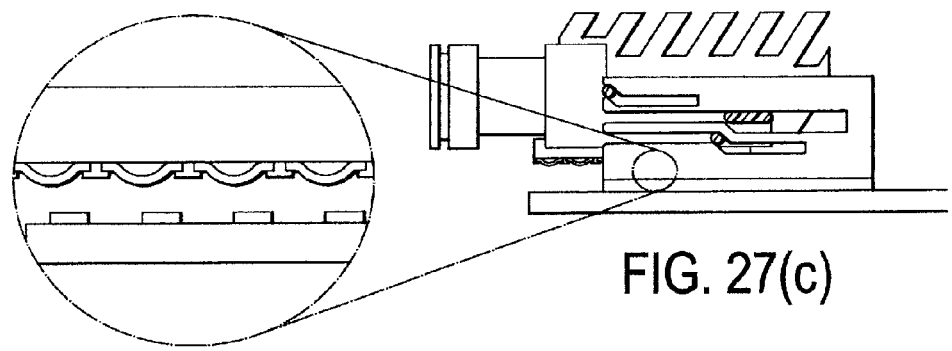
Figure 27D:
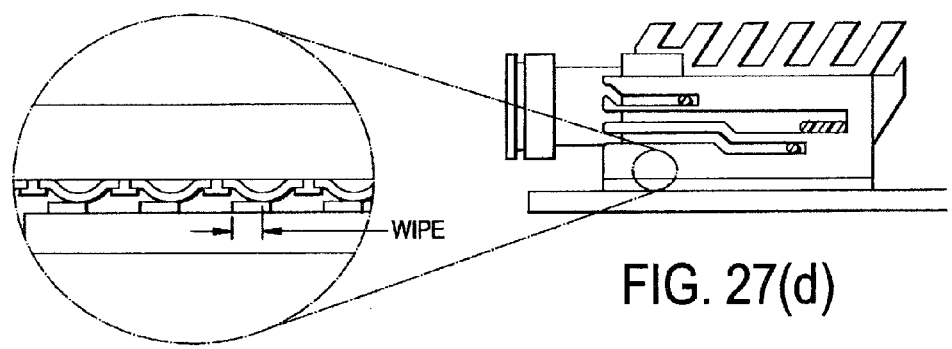

The first boss enters its channel and aligns the connectors with one another (FIG. 27(b). The second boss, followed by the third boss, then enter their respective channels (FIG. 27(b), (c). The second and third bosses are simultaneously pressed downward by their respective channels as the bosses extend further into the channels, FIG. 27(c). That, in turn, presses the male connector downward so that the contacts of the male connector mate with the contacts on the receiving connector, FIG. 27(d). The second boss is set toward the front of the male connector and the third boss is set toward the rear of the male connector. The second and third bosses ensure that the male connector does not pivot or move when positioned with respect to the receiving connector.

Figure 28:
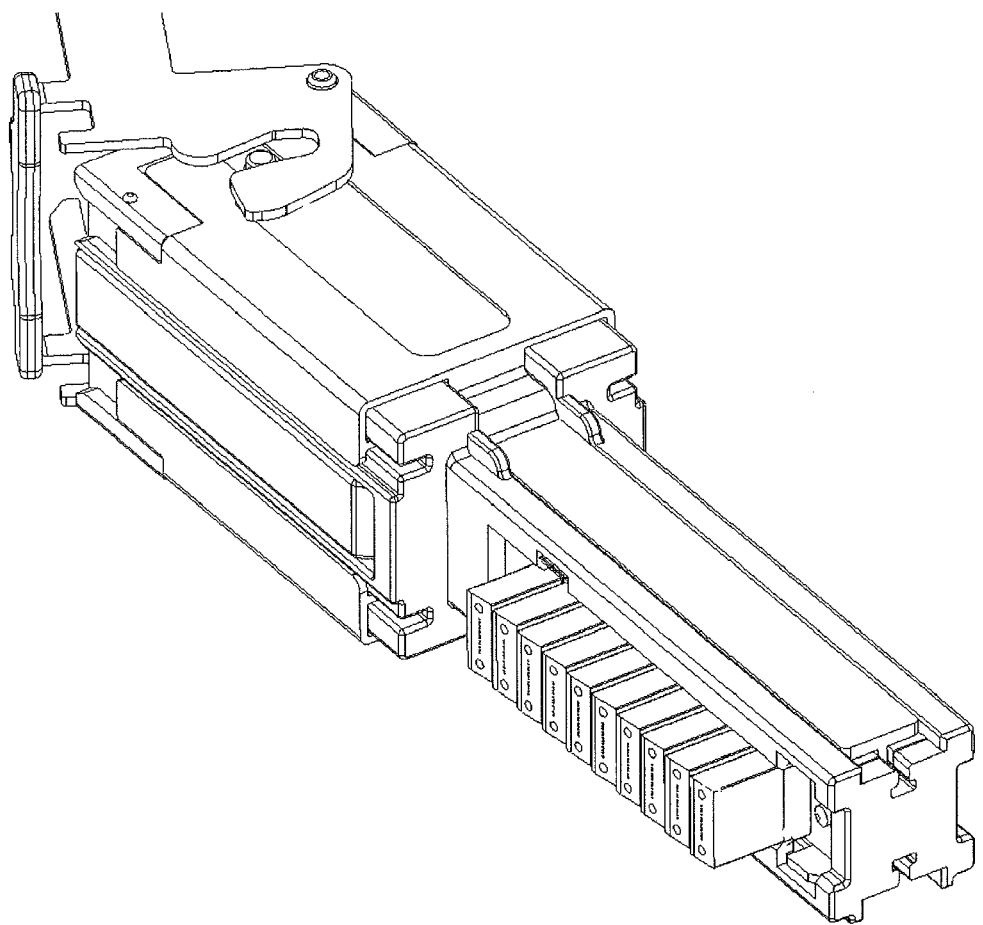
FIGS. 28-31 show another alternative embodiment of the invention in which only optical elements are provided.
Figure 29:
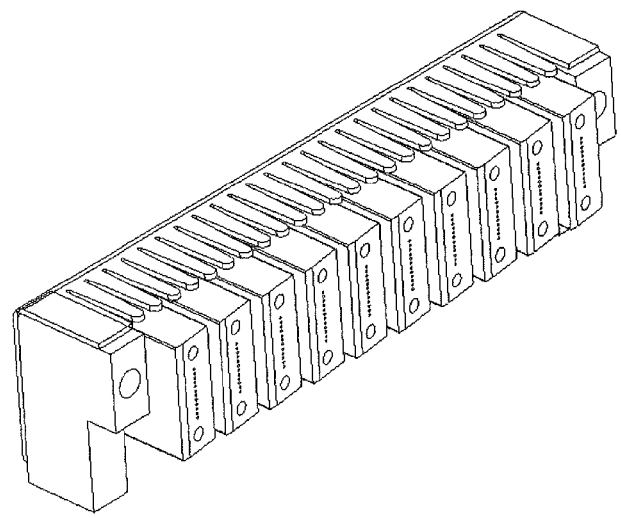
Figure 30:
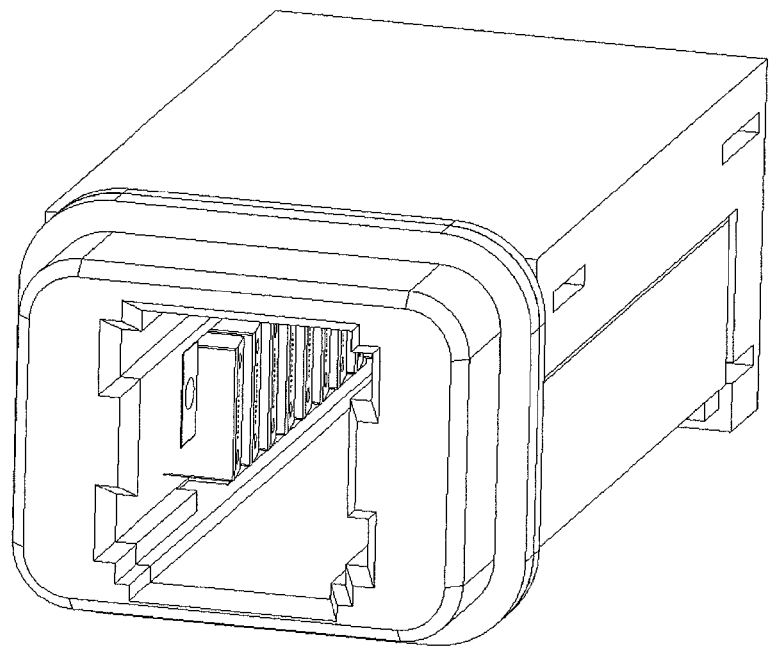
Figure 31:
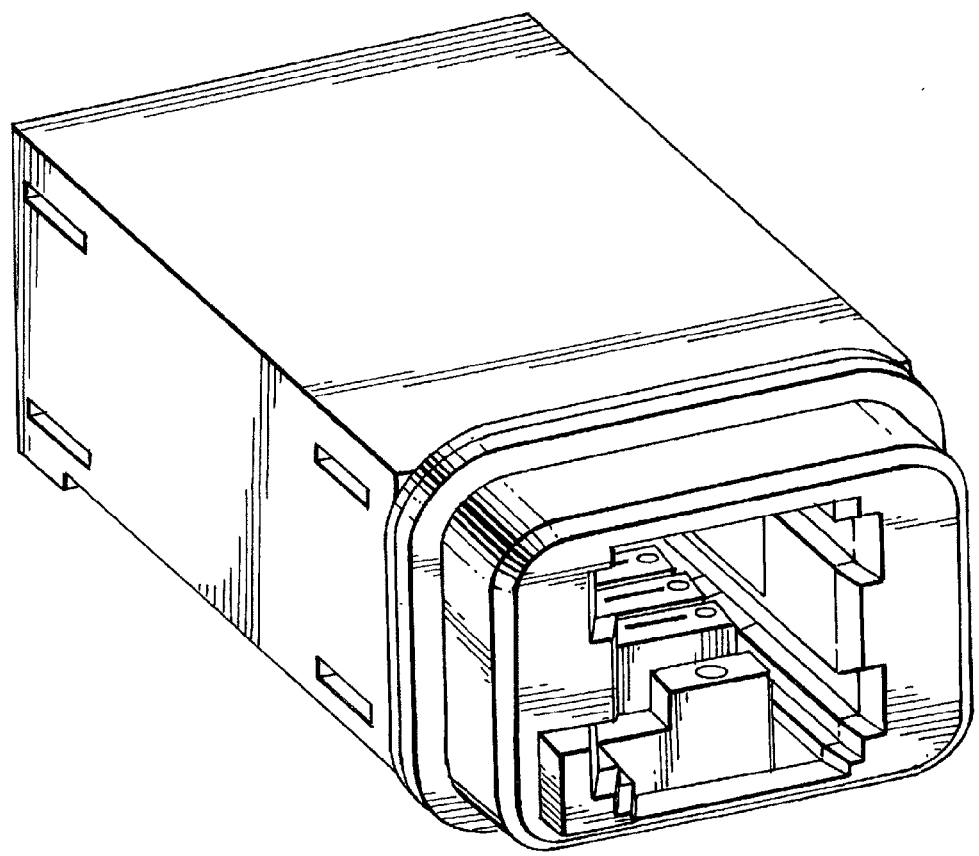

Furthermore, it is not required that the current configuration be electrical. Rather, an all optical solution can be provided since the fiber optic ferrules typically conjoin in a butt-coupling fashion. In such an arrangement, the optics could be connected to optical flex circuits or directly to VCSEL's mounted on the card. One such embodiment is shown in FIGS. 28-31. In the current embodiment, the male member is fitted with optical modules that extend out of the sides of the male member (FIG. 28). In addition, the connector assembly is fitted with optical modules (FIG. 29) that align inside the socket (FIGS. 30, 31) to mate with the optical modules of the male member.

The connector assembly 5 provides a number of advantages that will be apparent to one of skill in the art from the above descriptions. The connector assembly 5 implements a floating circuit card technology, whereby each of the internal circuit cards 172 are free to move within the connector when unmated from the socket/panel. This provides the advantage of having a slim connector on the front panel 20 (driving density) since more devices are packaged in one housing thereby eliminating extra material while being able to couple on the sides of the connector 5 as is represented in cards 174 and socket 506, as opposed to being coupled at the end of the connector 5.

The present invention also addresses the problem of high density trace routing since traces may be routed directly down the center of the connector 500 between the corresponding electrical modules and there is no need to take up additional side space beyond the connector side wall, which allows connectors to be placed on a tighter front panel cutout pitch. Also the present design is readily scalable for connector variations. It could double as a dual transmitter or a dual receiver or even lower density fiber count transceiver since it is not required that all the fibers be used. In other words, one could adopt a less dense transmit and receive combination and still use the same overall packaging.

The transceiver 400 has been provided with shutter doors that only open when the transceiver is mated, to protect the fibers contained within. In addition, the transceiver 400 is able to couple in a wide manner of styles since the bi-directional movement provides an additional degree of freedom for applications that require a high density connection. By coupling on the sides or even the bottom of the connector, this ability allows for efficiencies in packaging and scalabilities. In addition, the present invention can be modified to incorporate an electrical package and/or an optical package, which further increases the flexibility of its use.

This bi-directional mating does not require a front panel to function. As shown in FIG. 1, the front end mating connector 10 is an elongated member that extends substantially perpendicular to the edge of a board 7 and the front face of the panel 20 with which it is connected. That is, the connector 10 has a longitudinal axis which is perpendicular to the front face of the panel 20 and to the edge of the board 7. Likewise, the socket 500 is also elongated and extends substantially perpendicular to the face of the panel 20 and the edge of the board 7. The face of the panel 20 is in a plane that is perpendicular to the plane of the board 7. Therefore the connector assembly 5 can be implemented without a panel 20, and instead the socket 500 can be directly connected to the board 7.

Another key feature is the socket lead organizer which prevents movement during soldering by containing the tails of the leads. When the connector is placed on the card there is often a slight downward load applied. This load can cause the position of the pins to shift in relation to the exposed pads on the daughter card. By using the organizer, this prevents any dramatic shifts which would cause for opens or shorts once the connector is soldered to the card.

In addition, though the preferred embodiment provides a socket at the panel 20, into which the male member 250 extends, the panel 20 can be fitted with a male member and a socket slidably received over it.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described.

Rather, all suitable modifications and equivalents may be resorted to, falling within the scope of the invention.

We claim:

1. A connector assembly comprising:
   a first electrical connector having a male member, the male member having a front end and a side;
   at least one first contact comprising a pad on a circuit board, said at least one first contact positioned along the male member of said first electrical connector and accessible at or through the side of the male member;
   a second electrical connector having an opening for receiving the male member of said first electrical connector; and,
   at least one second contact positioned along an interior side of the opening of said second electrical connector, wherein said at least one second contact is aligned with said at least one first contact when the male member of said first electrical connector is received in the opening of said second electrical connector.

2. The connector assembly of claim 1, further comprising a panel having a front surface, and wherein said second electrical connector is mounted in the front surface of said panel so that at least a portion of said second electrical connector engages the panel.

3. The connector assembly of claim 1, wherein said at least one second contact engages said at least one first contact when the male member of said first electrical connector is received in the opening of said second electrical connector.

4. The connector assembly of claim 1, wherein said second electrical connector comprises a socket.

5. The connector assembly of claim 1, wherein said at least one second contact forms a part of an electrical wafer.

6. The connector assembly of claim 5, wherein said electrical wafer is connected to a circuit board.

7. The connector assembly of claim 1, wherein said male member has a longitudinal axis and said male member is received by the opening of said second electrical connector in a direction that is substantially parallel to the longitudinal axis.

8. The connector assembly of claim 7, wherein said at least one first contact comprises a plurality of contacts that extend parallel to the longitudinal axis.

9. The connector assembly of claim 1, wherein said male member is received in the opening of said second electrical connector in a first direction and said at least one first contact is movable in a second direction to engage said at least one second contact.

10. The connector assembly of claim 9, wherein the first direction is substantially perpendicular to the second direction.

* * * * *